INVENTOR.
ALBERT G. BODINE JR.
BY
ATTORNEY

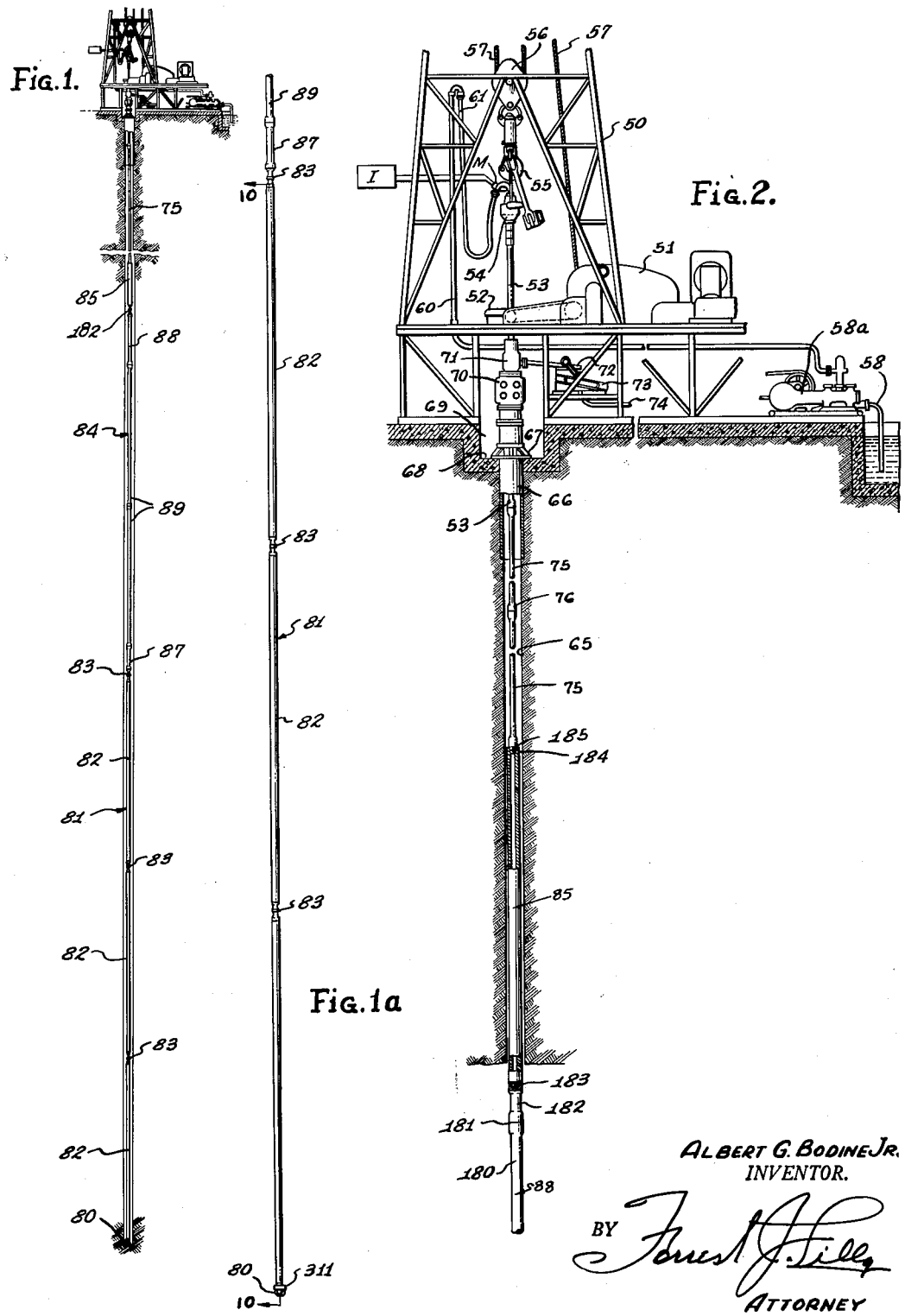

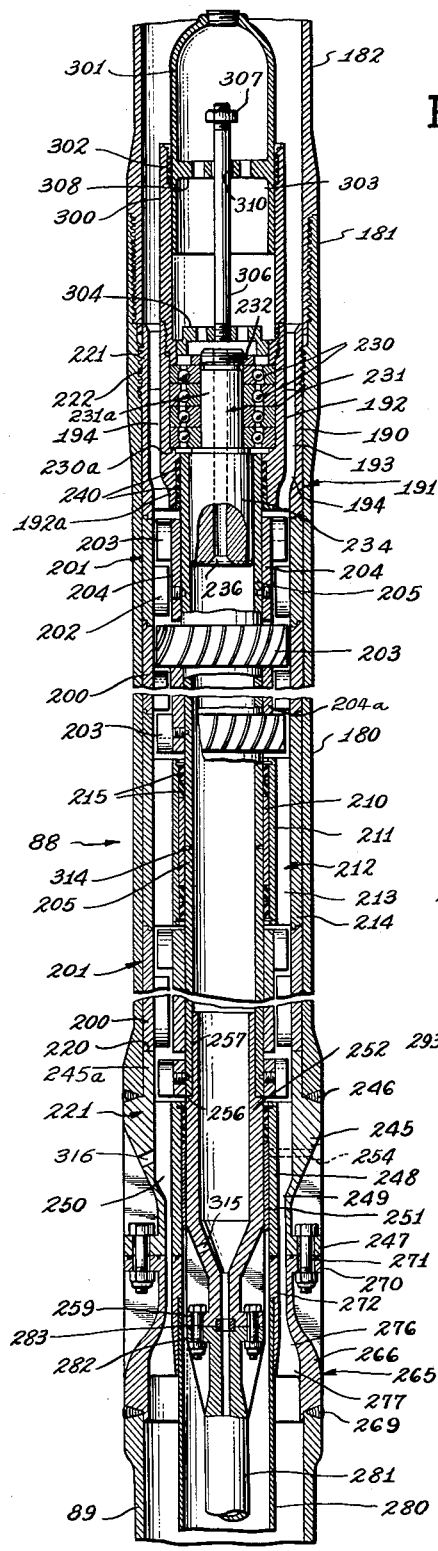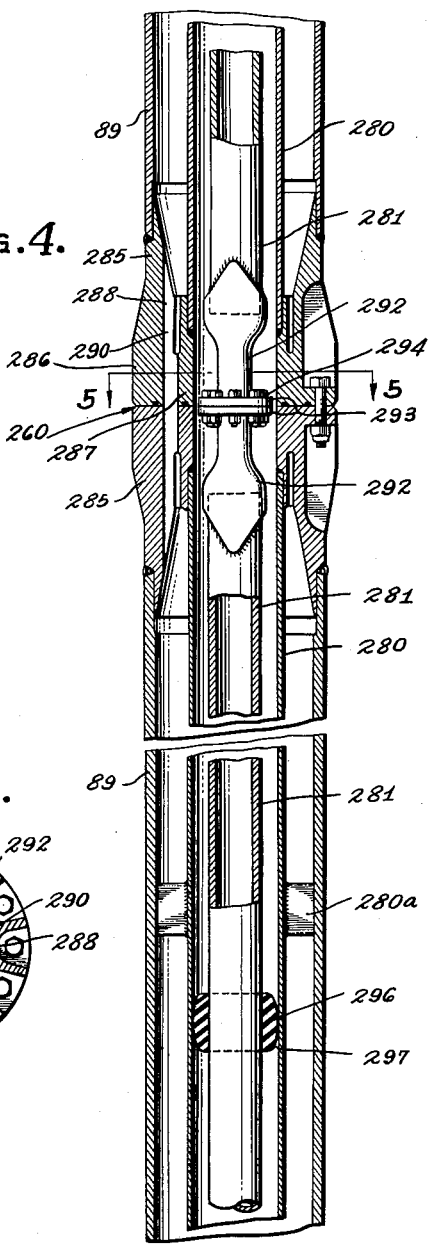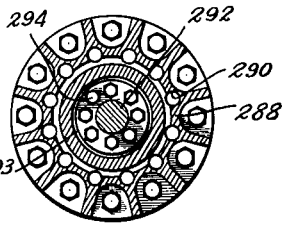

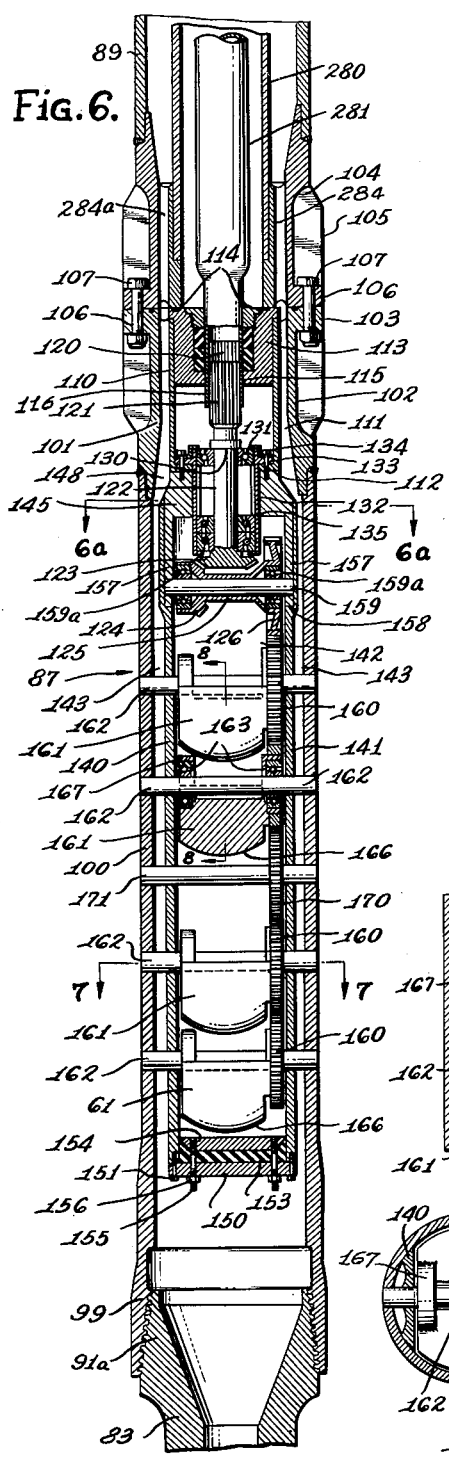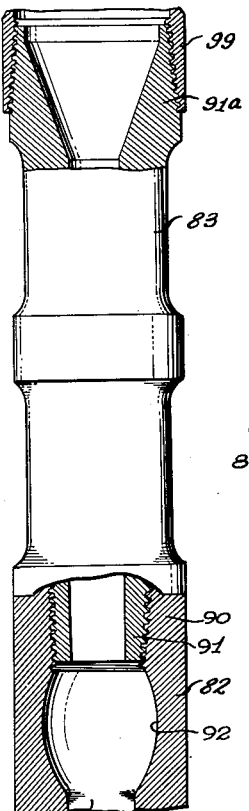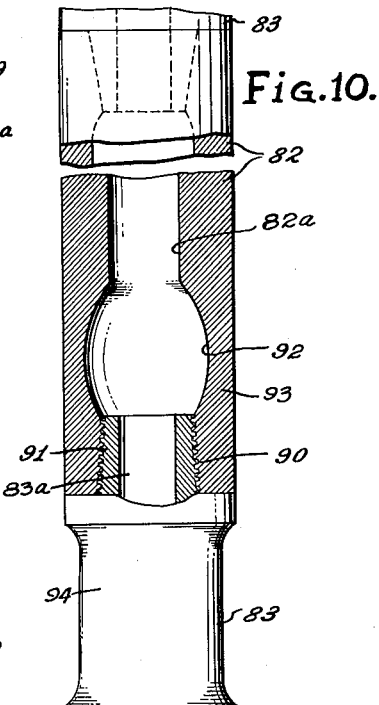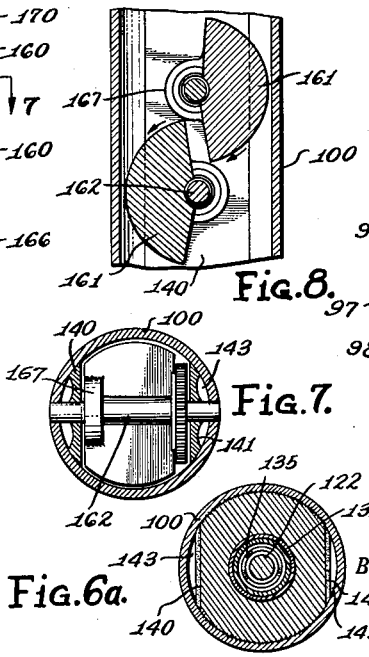
Sept. 13, 1955 — A. G. BODINE, JR — 2,717,763
EARTH BORING APPARATUS WITH ACOUSTIC DECOUPLER FOR DRILLING MUD
Filed April 3, 1951 — 6 Sheets-Sheet 3
INVENTOR.
ALBERT G. BODINE JR.
BY
ATTORNEY Sept. 13, 1955  A. G. BODINE, JR  2,717,763
EARTH BORING APPARATUS WITH ACOUSTIC
DECOUPLER FOR DRILLING MUD
Filed April 3, 1951  6 Sheets-Sheet 4

Sept. 13, 1955 A. G. BODINE, JR 2,717,763
EARTH BORING APPARATUS WITH ACOUSTIC
DECOUPLER FOR DRILLING MUD
Filed April 3, 1951 6 Sheets-Sheet 5

INVENTOR.
ALBERT G. BODINE JR.
BY
ATTORNEY

Sept. 13, 1955

A. G. BODINE, JR
EARTH BORING APPARATUS WITH ACOUSTIC
DECOUPLER FOR DRILLING MUD 2,717,763

Filed April 3, 1951

ALBERT G. BODINE JR.
INVENTOR.

BY *Farrel J. Tilly*

ATTORNEY

United States Patent Office 2,717,763
Patented Sept. 13, 1955

2,717,763

EARTH BORING APPARATUS WITH ACOUSTIC DECOUPLER FOR DRILLING MUD

Albert G. Bodine, Jr., Van Nuys, Calif.

Application April 3, 1951, Serial No. 219,088

16 Claims. (Cl. 255—4.6)

This invention relates generally to earth boring, particularly, though not limited to, boring through especially hard rock formations, and it deals especially with drilling apparatus which longitudinally vibrates the drill bit while the latter is being applied to the formation. The present application is a continuation-in-part of my copending application Serial No. 200,277, filed December 11, 1950, now Patent No. 2,554,005 issued May 22, 1951, and entitled Earth Boring Apparatus, which application was a continuation-in-part of my parent copending application entitled Earth Boring Tool, filed September 16, 1946, Serial No. 697,235, now abandoned.

The general object of the invention is the provision of a novel and more powerful form of earth boring apparatus than has heretofore been known in the art, employing a bit which is vibrated longitudinally against the formation, and employing also means for minimizing or eliminating loss of vibrational energy into the mud fluid employed in drilling.

In order to disclose my invention in logical order, I will first describe my preferred sonic vibratory drill in considerable detail, will then point out how such a sonic drill is characteristically prone to loss of a part of its vibration energy into the mud fluid used therewith, and will thereafter describe my present invention and how it meets the energy loss problem presented by my vibratory drill. Finally, it will be shown how the present invention is also applicable to and useful with other types of earth boring drill having longitudinal vibration.

My preferred sonic drill bores through hard and dense earthen formation, such as granite, by apparently causing the formation to undergo an elastic vibration, which results in failure of the formation under the bit by elastic vibration fatigue. This performance I accomplish by proceeding with apparatus designed to radiate sound waves (elastic waves of tension and compression) from the bit into the formation, the bit being acoustically coupled to the formation by being held forcibly against it, and being at the same time vibrated longitudinally to transmit the waves to and into the formation. Earthen formation can apparently be thus set into a substantial degree of elastic vibration; and since rock cannot withstand substantial tensile stresses or stress reversals, rapid fatigue and fracture of the formation under the bit is accomplished. The drill of the invention also drills at high speed through the softer formations, though whether the same vibration fatigue failure is likely to occur in such case is still open to speculation.

It is apparently not possible, however, to elastically vibrate earthen formation at very high amplitude, the maximum obtainable deformation stroke or displacement range evidently being not over ⅜ to ½ inch. Also, earthen formation is dynamically quite stiff, i. e., it requires a cyclic force of very high amplitude to vibrate it even through a relatively low displacement range. In terms of acoustics, the formation may be said to have high acoustic impedance, by which term is understood the ratio of the cyclic force exerted to the resulting displacement velocity. Velocity amplitude is of course low when displacement amplitude is low. I have found that the bit should have movement and force characteristics correlated to these vibration characteristics of the formation. Specifically, I have found that the bit should have vibratory motion of low amplitude (compatible with the low amplitude movement of the formation), with high cyclic force exertion against the formation.

I employ an elastic vibration generator which is an assembly or combination of motor means and mechanical vibrator, the mechanical vibrator being driven by the motor means, and being, in turn, drivingly coupled to the bit. The vibrator is of a type characterized by use of a mechanically moving mechanism, and the motor means which drives said mechanism may be of any type, electric, hydraulic, or otherwise, conforming to certain requirements to be presently explained. First of all, the motor means must of course be of sufficiently compact lateral dimensions to go into the bore hole, and the only way a motor can be so restricted in dimensions and still develop the necessary power to drive the bit is to employ a motor characterized by a high displacement rate. As an example, a hydraulic motor suited to the problem should be one handling many gallons per minute; and an electric motor or solenoid should be characterized by a large product of armature velocity and armature area. A simple commercially available motor of relatively high speed and relatively low force or torque meets this requirement. Unfortunately, however, while such a high speed, low force or low torque motor is compatible with the requirement that the motor be kept small enough to enter the bore hole, such a motor is not suited for direct drive of the bit, which has been shown to require power of precisely the opposite form, namely, a high ratio of force to velocity.

The drill accordingly incorporates, as an integral part of the vibration generator assembly or combination, and between the motor means thereof and the point of vibratory power delivery, a velocity reducing mechanical transformer. This velocity reducer establishes an effective coupling between large displacement rate in the motor, and small effective linear velocity at the vibratory bit. In fact, the success of my sonic drill has been found to depend on the provision of this velocity reducer as a means for adjusting and coupling the very active motor means to the relatively sluggish or stolid formation, permitting an effective drive of the latter by the former.

Maximum power delivery from the system depends, at least in part, upon establishment of substantially a fixed value for the product of force and velocity at all points of the system from the power source to the load, even though the quotient of force and velocity be varied. This feature is especially evident within the generator assembly in the velocity reducing coupling of the high displacement rate motor to the vibratory power output, wherein a substantially constant product of force and velocity is preserved throughout. It should be evident that this velocity reducing means is likewise a force gaining device for a high displacement rate motor. The velocity reducing transformer can take various forms, as noted hereinafter, including reactive force build-up (with consequent velocity reduction) in fact moving or heavy constrained mass vibrators, multi-stage motors, and leverage devices such as gear trains or cams. In all cases we find a high displacement rate motor, followed by force gain and velocity reduction, and a substantially constant product of force and velocity.

Inasmuch as the vibration generator assembly delivers a longitudinal vibration for actuation of the bit, it necessarily follows that at least a portion of the generator assembly, including some of its necessary attachment structure, must partake of a longitudinal vibratory motion similar to that of the bit. The inertia of this vibratory structure as well as that of the bit, is deterrent to the desired vibratory motion, a reciprocating inertia member in and of itself being inherently a waster of force. In addition, as already intimated, the bit evidently operates in many cases by vibrating a portion of the formation itself. To reduce the force wastage caused by these inertia factors, and to convert the inertias involved from a liability into an advantage, I convert the system into a resonant acoustic circuit by coupling into it a longitudinally vibratory elastic rod having such mass and stiffness parameters as will "tune out" the described inertia factors. The vibration generator is driven with a frequency such as will resonate this rod and the inertia members to which it is coupled, and the force wastage mentioned above is thereby corrected. In addition, this vibratory rod introduces into the system an important and highly advantageous fly-wheel type of momentum.

In a typical arrangement, the vibration generator is coupled to the upper end of this elastic rod, and the bit is coupled to the lower end thereof, while a drill string, either pipe or wire line, is employed to lower the assembly in the bore hole. Other arrangements are equally feasible, and as one example I may mention the location of the generator between the lower end of the elastic rod and the bit. This elastic rod is a very long and massive member, and may typically consist of several steel drill collars coupled end to end, so as to make up a rod legnth of say 120 feet. Preferably the drill collars will have a cross-sectional area at least as great as, or greater than, that of a solid rod of one-half the diameter of the bore hole.

In operation, vibration forces generated by the elastic vibration generator are applied in a longitudinal direction to this elastically vibratory rod, and set up in the rod successive waves of tension and compression traveling in the rod with the speed of sound. The frequency of the vibration generator is adjusted to fall within the range of resonance of the rod for longitudinal elastic vibration. Resonance, as used in this specification and the appended claims, denotes, not a precise frequency, but a frequency range wherein longitudinal elastic vibration is substantially amplified by virtue of a complete or partial mutual cancellation of stiffness and inertial reactances at the frequency at which the generator is operated. Under these conditions, the elastic rod exhibits a longitudinal standing wave pattern, having one or more regions along its length where substantial longitudinal vibration can be observed, and one or more other regions where vibratory motion is either zero, or very small. In the described resonance range, the elastic stiffness of the rod "tunes out" the inertia of its own vibratory mass, the mass of the associated bodies such as the vibration generator housing and the bit, and the mass of any "coupled-in" portion of the formation that may vibrate with the bit, so that the wastage of force by all vibrating inertia bodies or members is minimized, and maximum vibration amplitude is thereby achieved.

The feature of velocity reduction and correlative force gain between the motor means and the point of power delivery from the vibrator to the elastically vibratory rod has already been mentioned. This is of particular importance and significance in my drilling system, which, with its resonant vibratory rod, is actually a resonant acoustic circuit. It can be analyzed acoustically by considering that the earthen formation represents a high impedance load, and the power available within the motor is in a low impedance form (high displacement rate). The invention then provides an impedance adjustor to provide an effective or necessary degree of impedance matching between the low impedance motor and the high impedance load, so as to achieve reasonable power delivery from the motor into the load. The velocity reducing mechanical transformer is accordingly an impedance adjusting device through which the small motor of high displacement rate is enabled to drive the bit against the formation with high cyclic force through a very small vibration amplitude.

A powerful vibratory drilling apparatus such as that disclosed herein is prone to generate sound waves in the drill fluid used therewith. Drills of my sonic type are considerably longer, considering the combined length of drill collar or rod and bit, than a quarter wavelength of the sound wave so generated in the drilling fluid. Indeed, any drill to which the present invention applies has a combined length of drill rod and bit which is at least one-quarter wavelength of the sound wave tending to be generated in the drill fluid. There is otherwise no material proneness to sound wave radiation. With this understanding, sound waves may be generated from the bit of such a drill, or from any shoulders or offsets on the bit or collar not balanced by an oppositely facing shoulder or offset spaced materially less than a quarter wavelength (in the drill fluid) from the first named such formation, such sound waves may represent a large and significant subtraction from the energy supply to the bit action. Particularly, with the drill as heretofore described, where impedance adjustments have been made to assure large transfer of power from the prime mover to the drill, and from the drill to the formation, the prime mover becomes closely coupled to the mud fluid surrounding the drilling apparatus, and energy flows freely into the mud, robbing the bit of a substantial fraction of its driving energy. The invention provides broadly for acoustically "decoupling" the vibratory drilling apparatus from the drill fluid. The acoustic mud decoupler of the present invention is also useful to an appreciable extent with drills other than my sonic drill, provided such drills have a combined collar or rod and bit assembly characterized by a longitudinally vibratory motion, and are capable of setting up sound waves in the drill mud. Further objects of the invention are accordingly the provision of an acoustic mud decoupler for any such earth boring drill having longitudinal vibratory motion, and the provision of improved earth boring drills, of types characterized by longitudinal vibratory motion, which are equipped with acoustic mud decouplers.

The prior art contains many examples of devices for absorbing, accommodating or otherwise attenuating the pressure surges of sound waves in a fluid conduit system. The present invention is not concerned with devices for that purpose. It is not my purpose to stop sound waves once they have been generated in the mud. Such a purpose would overlook the fact that once the sound wave is generated, vibrational energy bleeds away, regardless of what is then done to stop the wave. My purpose, on the contrary, is to prevent the sound waves being generated in the mud, so that the drill will no longer be "conscious" of the presence of the mud, and will behave substantially as though the mud were not present. In brief, the sound wave is to be stopped before it is generated (while it is still possible to save the energy required for sound wave generation), rather than afterwards (when it is too late). That is to say, the drill assembly is prevented from being a generator of sound waves in the mud. This purpose is fulfilled by the acoustic decoupler of the invention.

Acoustic coupling of the reciprocating drill to the mud not only robs energy from the system, but tends to stall the tool and to prevent it from traveling through its intended range of reciprocation. That is to say, if the tool must expend large amounts of force and energy in sound wave generation in order to reciprocate, it will often be unable to reciprocate. In terms of acoustics, it is blocked or impeded by the acoustic impedance of the mud fluid.

In the case of my sonic drill, the drill collar rod is partially impeded or damped in its necessary longitudinal elastic reciprocation. The result is that the amplitude of elongation and contraction in the drill collar rod for a given output of energy and cyclic force from the generator is appreciably decreased.

The conventional toothed-cone rock bit coupled to the lower end of a drill collar, although non-sonic in its intended drilling action, nevertheless, because of its "tooth action" on the rock, must vibrate longitudinally to some extent in order to maintain contact, and as a consequence, has an inherent sound wave radiation proneness as regards the mud, though without the ability or power to generate the sound wave which would be involved along with the necessary vibration amplitude for effective cutting. As a result the bit and drill collar assembly becomes dynamically suspended in the mud body in the hole annulus. The drill apparatus literally "rides" on the mud. The acoustic impedance of the mud prevents the system from dropping appreciably after the cutter rolls over a tooth peak, and therefore the next tooth peak is unable to support much of the load of the drill collar to accomplish the intended cutting action on the bottom of the hole. In more particular, in order for each tooth of the cutter cone to strike its maximum blow, the drill string assembly must drop slightly between successive tooth impacts. To do this, the drilling assembly would have to alternately compress and expand some mud volume, since the mud has too much inertia to simply accelerate up and down the hole with each desired drop and rise of the drill string at the frequency at which the described bodily reciprocation should occur. Such frequency may be, for example, of the order of 2,000 cycles per second. Since insufficient power is available for the described performance, the net result is that the system partially floats on the mud column during drilling. The driller's weight meter shows weight on bottom, but does not explain that this weight is not all on the cutter teeth.

There are still other forms of reciprocating or hammering drills which are impeded by the mud fluid, and to which the present invention is applicable, but the examples given should be sufficient for a complete disclosure of the invention.

In general, I have found that by the time the hole has become deep enough to have a sufficient hydrostatic head so that the high pressure mud at the bottom of the hole is elastically compressed to a considerable extent, the mud, owing to the stored elastic energy, becomes "springy" enough to follow and stay in contact with a reciprocating bit. This means that, at substantial depths, a reciprocating drilling tool that causes a periodic displacement of the mud fluid will not cavitate the mud. Under these conditions the system is "acoustically coupled." It is then always "conscious" of the acoustic impedance of the mud, acoustic impedance being understood to have its usual definition $\rho c$, where $\rho$ is the density of the mud and $c$ is the speed of sound therein. When acoustically decoupled, however, the reciprocating drilling tool no longer knows the mud is present. The tool is enabled to reciprocate free and unhindered, with vigorous and effective performance.

A number of illustrative forms of acoustic decoupler will be disclosed. Their characteristic is that they comprise a device presenting an acoustic impedance which is low compared with the characteristic acoustic impedance of the mud fluid. This low acoustic impedance stops the delivery of acoustic power from the drill to the mud.

In order to stop the generation of the sound wave, I locate the acoustic decoupler a substantial distance less than a quarter wave length, measured in the mud fluid, from the source of wave generation on the drill. If the decoupler is spaced as much as a quarter wave length away, a strong wave can be started; and even if it is then stopped, some energy has been lost. The present invention accordingly consists, in its broad form, in the location of the acoustic mud decoupler at a distance from the potential source of wave generation which is substantially less than a quarter wave length. This prevents the potential source from actually being a source of wave generation.

The invention will be more fully understood from the following detailed description of certain present illustrative embodiments thereof, reference being made to the accompanying drawings, in which:

Figure 1 is a view showing the drilling apparatus of the present invention suspended in a well bore;

Figure 1a is an elevational view showing the vibratory portion of the apparatus of Figure 1 to a somewhat larger scale;

Figure 2 is a view, partly in elevation and partly in section, showing a typical installation of surface equipment and showing the drilling string down to and including an upper portion of the drilling assembly proper;

Figure 3 is a longitudinal sectional view of the drive motor unit of the drilling apparatus, Figure 3 including the lower end portion of the string shown in Figure 2 (but to a larger scale), and showing also the upper portion of a transmission shaft section of the apparatus;

Figure 4 is a longitudinal sectional view of a portion of the transmission shaft section of the apparatus which follows below the motor unit of Figure 3;

Figure 5 is a transverse section taken on line 5—5 of Figure 4;

Figure 6 is a longitudinal sectional view of the vibrator unit at the lower end of the transmission shaft section;

Figure 6a is a cross-section taken on the line 6a—6a of Figure 6;

Figure 7 is a transverse section taken on line 7—7 of of Figure 6;

Figure 8 is a detail section taken on line 8—8 of Figure 6 with the weights in a half raised position;

Figure 9 is an elevational view, partly in section, showing a sub intercoupling the vibrator to the upper end of the drill collar strip;

Figure 10 is a longitudinal section, with parts broken away, of the vibratory drill collar string and bit, equipped with one form of acoustic decoupler, this figure being a section taken on line 10—10 of Figure 1a;

Figure 14:
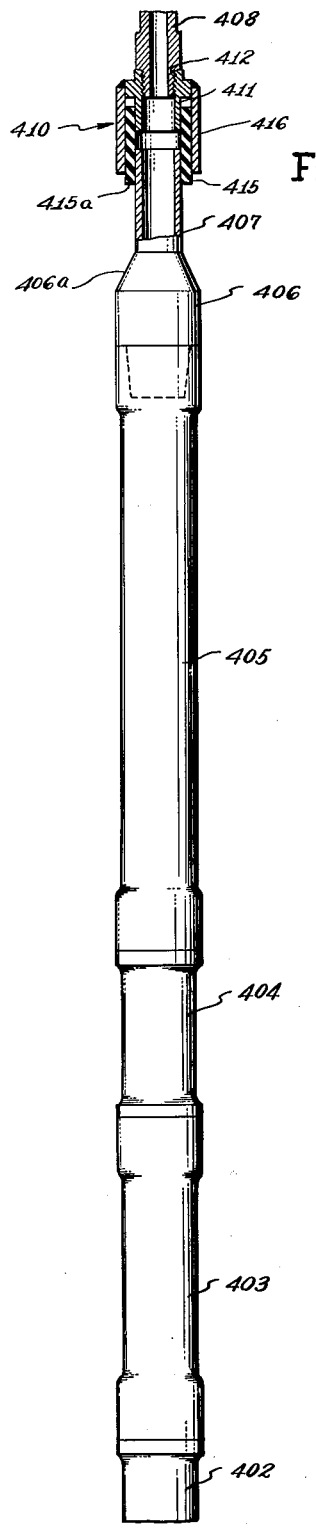
Figure 15:
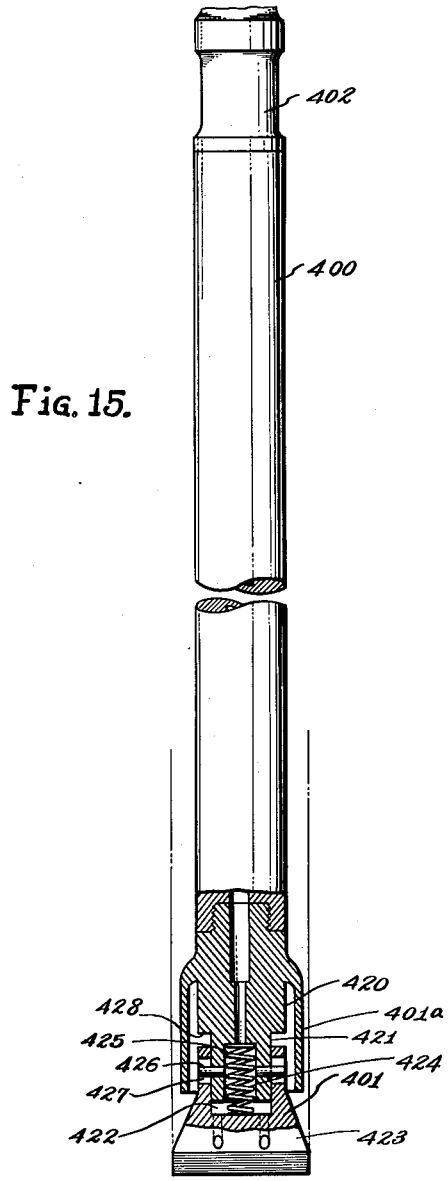
Figure 16:
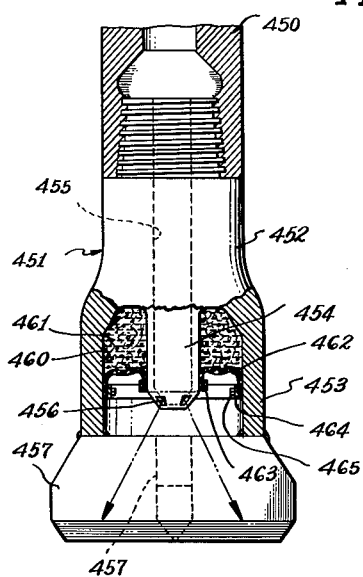
Figure 17:
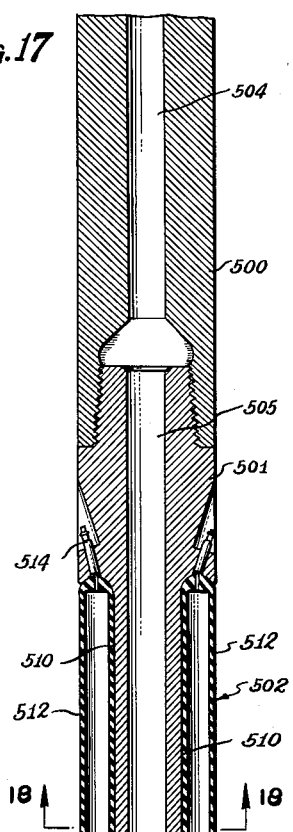
Figure 20:
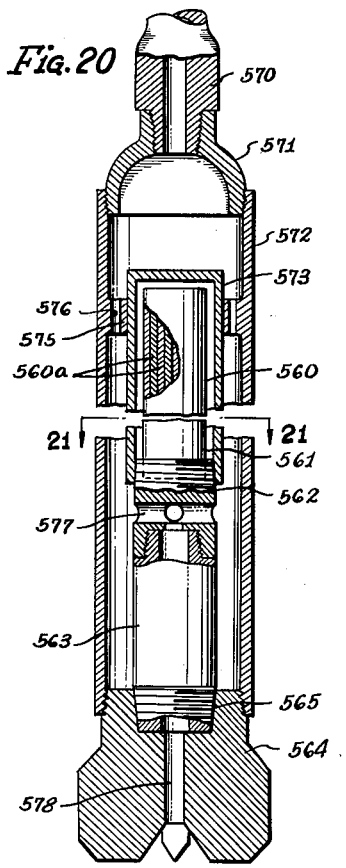
Figure 18:
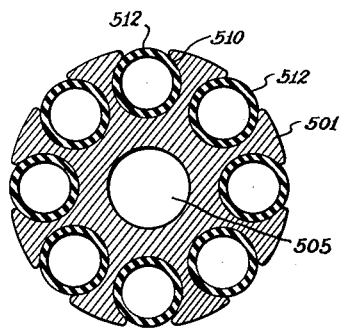
Figure 19:
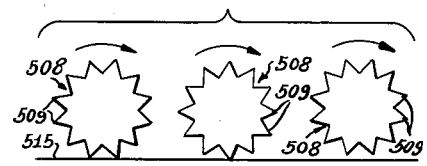

Figures 14 and 15 taken together show another embodiment of the invention;

Figure 16 shows a bit having another form of acoustic decoupling means in accordance with the invention;

Figure 17 is a view largely in longitudinal medial section, but partially in elevation, showing a conventional rock bit drill apparatus equipped with an acoustic mud decoupler, in accordance with the invention;

Figure 18 is a section taken on line 18—18 of Figure 17;

Figure 19 is a diagram illustrative of successive positions of a rock bit cutter cone under normal drilling conditions;

Figure 20 is a longitudinal section of another embodiment of the invention; and

Figure 21:
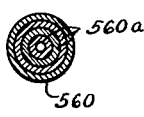

Figure 21 is a section on line 21—21 of Figure 20.

Reference is first directed to Figures 1 to 10, which show in detail one present illustrative sonic drill of the preferred impedance adjusted type, equipped with mud decoupling provisions in accordance with the invention. At the ground surface (Figures 1 and 2) is the usual conventional drilling equipment, including derrick 50, draw works 51 driving rotary table 52, kelly 53 extending through table 52, swivel 54 coupled to the upper end of the fluid passage through kelly 53, and hook 55 supporting the bail of swivel 54. Hook 55 is in turn suspended through traveling block 56 and cable 57 from the usual crown block (not shown) at the top of the derrick, and the cable 57 is wound on the usual hoisting drum of the draw works. Mud fluid, such as is conventionally employed in rotary oil well drilling, is pumped through a supply pipe 58 from the supply tank or sump by means of mud pump 58a and is delivered under pressure from said pump via pipe 60 and hose 61 to the gooseneck of swivel 54, whence it flows down through kelly 53 to the drill pipe string coupled to the lower end of the kelly.

The bore hole 65 is lined for a suitable distance down from the ground surface by surface casing 66, which is supported by landing flange 67 resting on cement footing 68 in the bottom of pit 69. Mounted at the head of casing 66 is any suitable blowout preventer 70, and above the latter is riser 71 provided with mud flow line 72, this riser 71 being understood to communicate with casing 66 through blowout preventer 70. Mud delivery pipe 72 is shown discharing to conventional vibratory mud screen 73, and the mud is led from the latter back to the sump by way of pipe line 74.

Coupled to the lower end of kelly 53 is a conventional drill pipe string 75, and it will be understood that this pipe string will be made up of a number of usual drill pipe lengths coupled together by usual tool joints such as indicated at 76 (Figure 2).

The drilling assembly proper comprises, starting from the bottom: a bit 80; an elongated elastic longitudinally vibratory rod 81, of very substantial mass and length; in this instance made up of three conventional steel drill collars 82 connected end to end by subs 83 (Figure 1a); and an elastic vibration generator assembly or combination, generally designated by the numeral 84, said assembly being suspended from drill pipe string 75 by means of a relatively long and heavy sub 85. The elastic vibration generator assembly comprises a mechanical vibrator 87, a motor unit 88, and a long two-part casing 89 interconnecting the motor unit with the vibrator.

The drill collars 82 making up the elastic rod 81 are typically about 40 feet in length, with an outside diameter of 8 inches, and formed with a longitudinal fluid circulation bore 82a having an inside diameter of 3 inches. Preferably, the cross-sectional area of the drill collar should be at least equal to, or greater than, that of a solid cylindrical rod whose diameter is half the diameter of the bore hole. This of course means that the hollow steel collars 82 will have an outside diameter somewhat over 50% of the diameter of the bore hole.

The collars 82 have taper threaded coupling boxes 90 at each end for reception of the taper threaded coupling pins 91 on the opposite ends of the subs 83 employed to join the collars into one solid elastic bar. In order to avoid local stress concentrations such as might lead to failure of the box ends of the collars in service, the bore 82a of the collar is joined to the box 90 at each end by a smooth concave curve 92 forming a section 93 of reduced wall thickness, and therefore increased flexibility. This flexibility prevents severe stress concentrations at the box, and relieves the tendency for failure at that point.

The subs 83 have longitudinal circulation passages 83a communicating with the collar bores 82a, and they are preferably reduced in wall thickness as indicated at 94, to improve flexibility and thereby avoid a tendency toward failure of the coupling pins 91.

The lowermost of the collars 82 receives in its coupling box 90 the threaded pin 91 on the upper end of a suitable bit 80. The bit 80 may be of various types, but a simple form which has operated satisfactorily in practice is a wing type having four wings 96, formed as clearly illustrated in Figure 10. The bit also has circulation passageway 97 communicating with the fluid passage through the collars, and provided, between the wings 96, with lateral fluid discharge ports 98.

The uppermost collar-coupling sub 83 has at the top a somewhat enlarged threaded coupling pin 91a, screwed into the threaded lower end 99 of the tubular casing 100 of vibrator 87. This vibrator 87 may be any suitable type of mechanical vibrator designed to generate a cyclic force in a direction longitudinal of the elastic vibratory rod 81, and at the frequency of a longitudinal resonant elastic vibration of said rod. By the term "mechanical vibrator" is meant, not necessarily one formed exclusively of mechanical parts or links, but one having a mechanically moving mechanism within it. One satisfactory type of mechanical vibrator is of an inertia weight type, comprising a plurality of eccentrically weighted rotors, arranged to balance out lateral components of vibration, but to produce a summatiotn of vertical components, so that there is a substantial resultant of vertically directed alternating force. Such a vibrator is shown in Figures 6, 7 and 8, and will now be described.

The upper end of the vibrator casing 100 is bolted to the lower end of the aforementioned casing 89. As here shown, the upper end of casing 100 has welded thereto the outer casing portion 101 of a spider member 102, and said casing portion 101 is necked in towards the top, and there provided with an outwardly extending bolt flange 103. In similar manner, there is welded to the lower end of sleeve 89 the outer casing portion 104 of a spider member 105, and the casing 104 is necked in, and then flanged outwardly, as at 106, to provide meeting flanges 103 and 106 which are connected by bolts 107.

The spider member 102 has, annularly spaced inside its casing portion 101, an inner sleeve portion 110, connected to casing portion 101 by webs 111 spaced to provide circulation passages therebetween, and this sleeve portion has at its lower end an inwardly turned mounting flange 112. A closure head 113 is secured inside sleeve 110, and has an outwardly extending flange 114 at its upper end shouldering down against the upper end of sleeve 110. This head 113 is formed with a bore 115 for a vertical transmission shaft end 116, and is counterbored from the top and threaded to receive packing and a packing nut, as indicated.

The transmission shaft end 116 is hollow and formed with longitudinal splines 120 engaging longitudinal splines 121 on a vibrator drive shaft 122. The lower end of the latter has a bevel gear 123 meshing with a bevel gear 124 formed near one end of a gear sleeve 125 whose other end carries a spur gear 126 driving the uppermost of the previously mentioned eccentrically weighted rotors.

Drive shaft 122 has a downwardly facing shoulder 130 engaging the inner ring of a ball thrust bearing 131, the outer ring of which is received in a cylindrical bearing housing 132. This housing has an external flange 133 near the top adapted to engage and be supported by the aforementioned sleeve flange 112, screws 134 securing said members in assembly. At its lower end bearing housing 132 is flanged inwardly, as indicated, to support radial ball bearings 135 for the drive shaft 122, all as clearly illustrated in Figure 6.

Two parallel, vertical check plates 140 and 141 are welded at their longitudinal edges to the interior surface of casing 100, and provide an interior housing space 142, and two longitudinal vertical passageways 143 at the sides for circulation of mud fluid. These plates 140 and 141 extend from a point just below the lower end of sleeve 110 to a point nearly to the lower end of casing 100. A closure member 145 has a head portion which is supported against flanges 112 by the aforementioned screws 134, and which is centrally bored to snugly embrace the bearing housing 132. This closure member 145 is shaped at the bottom to be snugly received at two opposite sides inside the check plates 140 and 141, and at its two remaining sides to engage the interior surface of the casing 100, and is welded all around to the plates 140 and 141 and to the inner surface of the casing 100, so as to close off the vibrator housing space 142 at the top. Accordingly, mud fluid from the space 148 can flow downwardly through the casing 100 by way of the previously described mud passages 143, but is excluded from the housing space 142. The housing space 142 is closed at the bottom by a bottom closure plate 150 secured to cheek plates 140 and 141 by screws 151, and it will be understood that the ends of this plate are rounded so as to contact the inside surface of casing 100 between the plates 140 and 141. A rubber gasket 153 is placed on top of plate 150, and a clamp plate 154 resting on gasket 153 carries studs 155 which extend down through the gasket and through closure plate 150. After the parts are assembled, nuts 156 are set up on these studs, and draw clamp plate 154 downwardly to squeeze the rubber gasket laterally against the plates 140 and 141 and against the surface of casing 100 so as to provide a seal against the mud fluid.

The closure member 145 has two depending extensions 157 fitted just inside the cheek plates 140 and 141 and seated against shoulders at 158. These extensions 157 carry a transverse shaft 159 which extends through gear sleeve 125 and which supports the inner ring of ball bearings 159a whose outer rings support the aforementioned bevel gear 124 and spur gear 126.

Spur gear 126 meshes with a spur gear 160 on the upper of a series of eccentrically weighted rotors 161 mounted in vertically spaced relation in the housing space 142. Each rotor 161 is mounted on a transverse shaft 162 extending through cheek plates 140 and 141 and set into the walls of casing 100. Mounted on these shafts, just inside cheek plates 140 and 141, are the inner rings of ball bearings 163, and the rotors 161 are formed to embrace the outer rings of these bearings. It will be seen that the rotors consist essentially of inertia weights 166 located at one side of the shafts 162, and that the bearings are seated partially in these inertia weight members and partially in substantially half-round straps 167 extending from the weights. At one side, the weight 166 is cut away, and the strap is enlarged, to form a seat for the aforementioned spur gear 160, which may be provided with a shrink fit on the rotor.

The spur gear 160 of the uppermost rotor 161 meshes with the corresponding spur gear 160 of the second rotor 161, and the latter gear 160 meshes with an idler gear 170 carried by a transverse shaft 171 mounted on the cheek plates and casing in the same way as the shafts 162. This idler 170 meshes with the spur gear 160 of the third rotor 161, and the gear of the third rotor meshes with the gear of the fourth, all as clearly shown in Figure 6. The several rotors are all arranged so that their unbalanced weights 166 move up and down in unison, which is accomplished if for instance they are all initially positioned with their weights at the bottom, as in Figure 6.

It will be evident that each eccentrically weighted rotor will exert a thrust at its bearing as it rotates. Only the thrust in the vertical or longitudinal direction is however useful, lateral components being not only useless but tending to produce severe lateral vibrations unless balanced out. By arranging the rotors in pairs of oppositely rotating members, the vertical components of thrust are additive, while lateral components are cancelled. The preferred arrangement shown includes two such pairs of unbalanced rotors, and it can readily be seen that, with the rotors all arranged to move vertically in unison, and with the two rotors of each pair arranged to turn in opposite directions, the vertical force components will be additive while the lateral components are balanced out. In addition, by use of the idler 170, the lateral force thrusts of the two inside rotors are always in the same direction, with the result that couples are also balanced out.

Accordingly, I have provided a simple, powerful device for producing a longitudinally directed alternating force, with no unbalanced lateral force components, and with no unbalanced couples. In effect, I have a device with longitudinal reciprocating inertia weight elements, which oscillate along a vertical or longitudinal direction line with simple harmonic motion, and which exert an alternating force at the bearings along the longitudinal direction line in accordance with their vertical component of acceleration and deceleration.

The resulting reaction at the rotor bearings is a vertically directed cyclic or alternating force, which is transmitted to the casing 100, and thence to the upper end of the vibratory elastic rod 81 through the uppermost sub 83.

The vibration generator includes, in addition to the vibrator 87 just described, a suitable motor unit 88, as shown in Figure 3, for driving the vibrator. While there are available many types of motor suited to the requirements of the invention, I here show a hydraulically driven type comprising a series of turbines designed to be driven by the mud fluid circulated through the system. The present motor unit, accordingly, includes a tubular turbine casing 180. The upper end of this casing has a threaded coupling at 181 to a relatively short length of casing 182, which is in turn coupled at its upper end to the relatively heavy sub 85. This sub 85 may typically have a cross-section similar to the drill collars, and may be of about 12 feet in length. At the lower end, this sub has a threaded pin 183 by which it is coupled into the upper end of the casing section 182, and at its upper end it may have a threaded box 184 for reception of the pin 185 on the lower end of the last section of drill pipe, as clearly indicated in Figure 2.

Snugly received in the upper end portion of turbine casing 180 is the outer tubular member 190 of a spider 191, said spider including an inner tubular member 192 annularly spaced inside but connected to the member 190 by means of webs 193. These webs 193 will be understood to be so spaced as to provide an annular series of fluid circulation passages 194 extending downwardly therebetween. The tubular members 190 of spider 191 rests on and is supported by the stator sleeve 200 of the uppermost of a series of turbine units 201, the sleeve 200 being snugly but removably fitted inside casing 180, and a plurality of such sleeves of successive turbine units being stacked on one another, as indicated. Referring to the uppermost turbine unit shown in Figure 3, the stator sleeve 200 has within its lower half a plurality of stator blades 202, and a plurality of rotor blades 203 are located just above blades 202, being formed on the upper half of a rotor sleeve 204 mounted concentrically within stator sleeve 201 on hollow turbine shaft 205. These turbine units may be of a conventional type, and further detailed description will accordingly not be necessary. There may be a number of these turbine units as desired; for example, a present embodiment has two series of turbine units of nine turbines each, separated by an intermediate bearing. In Figures 3, portions of the two series of turbine units have been broken away, and it is to be understood that as many turbine units may be employed as will be appropriate for the power requirements of the apparatus.

As will be seen from Figure 3, the annular blade space between the stator and turbine sleeves 200 and 204 is open at the top to receive mud fluid flowing downwardly through the passageways 194 of spider 191. This mud fluid passes downwardly through the turbine units in succession, imparting rotation to the rotors and so driving the turbine shaft 205.

The intermediate turbine shaft bearing comprises a bronze sleeve 210 received inside the inner sleeve member 211 of a spider 212, and the sleeve 211 being connected by spaced webs 213 to outer sleeve 214 which is snugly but removably received in side casing 180. Mud seals 215 are placed in the annular space between the turbine shaft and spider sleeve 211, at the two ends of bearing sleeve 210, and these mud seals may be secured in position by any suitable retainer device. The outer sleeve 214 of spider 212 engages the lowermost stator sleeve 200 of the stack of turbines above, and the spider is formed to accommodate, above inside sleeve 211 and within the upper portion of outer sleeve 214, an additional bladed turbine rotor having a short rotor sleeve 204a secured on the turbine shaft. The lower end of the outside sleeve 214 of the intermediate bearing spider 212 rests on the stator sleeves 200 of the second series of turbine units 201, which may be like the series already described, even to inclusion of the final additional rotor unit mounted on the turbine shaft below the lower end of the last turbine stator 200. The lowermost stator sleeve 200 will be seen in Figure 3 to engage the shoulder 220 formed at the top end of a coupling spider 221 to be further described hereinafter. Thus the entire series of stator sleeves, including intermediate bearing spider sleeve 214, and including also the outside sleeve 190 of spider 191, are stacked one on top the other and rested on this shoulder 220. This assembly is held in compression by a nut member 221 screwed into a threaded section 222 of casing 180 and engaging downwardly against the upper end of spider sleeve 190.

The aforementioned inner sleeve 192 of spider 191 consists of a housing for a plurality of thrust bearings 230 for the upper turbine shaft end 231. Thus, the outer race rings of the bearings 230 are supported by annular upwardly facing shoulders 230a formed inside the housing 192, while the inner rings of said bearings embrace the turbine shaft end 231, as shown. The extremity of shaft end 231 is threaded to receive a nut 232, which engages downwardly against the inner race ring of the uppermost thrust bearing 230, and it will thus be seen that the turbine shaft is suspended through the nut 232 from the inner race rings of the bearings 230. The turbine shaft end 231 comprises a short shaft section 234 tightly fitted and welded in the upper end portion of hollow turbine shaft 205. At the top, the shaft end 231 has reduced end portion 231a embraced by the inner rings of the bearings 230. The shaft end 231 is formed with central longitudinal bore 236 to permit passage of lubricating oil, as hereinafter more fully explained. Mud seals 240 placed between the upper end of the turbine shaft 205 and a downward extension 192a of bearing housing 192 prevent leakage of mud fluid to the bearings 230.

The previously mentioned coupling member 221 is in the nature of a spider, having an outer casing portion 245 welded to the lower end of casing 180, as indicated at 246, and this outer casing portion 245 is necked in, and then formed with a terminal bolt flange 247. The member 245 also has a sleeve extension 245a which extends up inside casing 180 to afford the aforementioned turbine supporting shoulder 220. The coupling member or spider 221 also includes inner sleeve portion 248, annularly spaced inside casing portion 245, and connected to the latter by spaced webs 249, between which are downwardly extending circulation passages 250 for the mud fluid. The inner sleeve member 248 confines a bronze bearing sleeve 251 which journals the lower end section 252 of the turbine shaft. The bearing sleeve 251 is removably postioned in the annular space between the turbine shaft section 252 and spider sleeve 248 by means of a screw 254. The turbine shaft section 252 consists of a hollow tubular member, welded to the lower end of turbine shaft member 205, as indicated at 256, and having a reduced end portion 257 extending telescopically upward inside the lower end portion of turbine shaft member 205 for some distance, as indicated. The lower end portion of the turbine shaft section 252 is necked down and then formed with a terminal bolt flange 259, located preferably a few inches below the bolt flange 247 at the lower end of the turbine casing. It is found desirable, for a reason to be explained hereinafter, to have the motor considerably spaced from the vibrator, and for this purpose, I connect the turbine shaft and turbine casing to the vibrator drive shaft and the vibrator casing by a relatively long section of transmission shaft and exterior casing. Thus, I may employ a long cylindrical casing 89, formed, for convenience, with a break joint at 260. In a typical apparatus in accordance with the invention, employing an elastic rod 81 of a length of the order of 120 feet, this casing 89 may have a typical overall length of approximately 60 feet, that is to say, approximately one-half the length of the vibratory elastic rod 81 made up of the three forty foot drill collars. This casing member 89 may be formed satisfactorily of two coupled lengths of ordinary well casing. At the upper end of the casing 89 there is provided a coupling member as spider 265 whose outer casing member 266 is welded to the member 89, as indicated at 269, and which is necked in and then formed with a terminal bolt flange 270 presented in opposition to bolt flanges 247, and connected thereto by bolts 271. Spider 265 also has an inner sleeve member 272 whose upper end is presented toward and meets the lower end of the sleeve portion 248 of the coupling spider 221 above. Suitable sealing means of any appropriate nature are provided between the abutting ends of the sleeve members 248 and 272 in order to prevent mud fluid from entering in between these members. Also, suitable seals will preferably be provided between the two abutting flanges 247 and 270. The inside sleeve member 272 of the spider 265 is annularly spaced inside outer spider member 266, and connected thereto by webs 276, which are spaced apart to leave circulation passages 277 therebetween. It will be seen that these circulation passages 277 aline with the circulation passages 250 in the coupling spider 221 above.

Tightly set into the inner sleeve 272 of spider 265 is the upper end of a transmission shaft housing tube 280, and the transmission shaft 281 has at its upper end a coupling flange 282 connected by bolts 283 to turbine shaft flange 259. The tube 280 extends down and into a sleeve member 284 connected by spaced webs 284a to the outer portion 104 of the aforementioned spider 105 at the lower end of casing 89. The tube is centered within the casing 89 by means of ribs 280a (Figure 4) welded to the tube and engageable with the casing.

The previously mentioned coupling 260 consists of similar spider members 285 mounted on the adjacent ends of the two sections of casing 89. These spiders 285 each comprise an outer thick-walled casing portion 286 welded to the casing 89, and an inside sleeve member 287, annularly spaced inside the casing portion 286 and connected thereto by spaced webs 288, so as to leave a plurality of circulation passageways 290 therebetween. The two adjacent ends of the broken drive shaft housing sleeve 280 are fitted inside and welded to the inner sleeve member 287. The transmission shaft 281 is also provided, at the location of coupling 260, with bolt connected flanges. As shown in Figure 4, the two adjacent ends of shaft 281 are welded into fittings 292 formed at their adjacent ends with flanges 293 connected by bolts 294. To center the transmission shaft 281 within the housing 280, the shaft 281 is provided with a plurality of longitudinally spaced bearings in the form of sleeve 296 tightly mounted on the shaft 281 and formed with a convex bearing surface 297 engaging the interior surface of the housing tube 280. These sleeves 292 are preferably formed of suitable plastic material, such as fabric filled phenolic resin. The lower end of the lower section of the transmission shaft 281 is reduced to form the aforementioned internally splined shaft section 115 which drivingly engages the vibrator drive shaft 121 in the manner shown in Figure 6.

Lubrication for the turbine and turbine shaft bearings is provided by locating a body of oil above the bearing housing shoulder 192 at the top end of the turbines. As shown, the upper end of the sleeve member 192 is internally threaded to receive the threaded lower end of oil cylinder 300, and telescopically receivable within this cylinder 300 is a cylindrical chamber member 301, suitable packing being provided at 302 to prevent leakage of oil contained within the expansive and contractive enclosure 303 thus provided. A spider 304 mounted in the lower end of cylinder 300 carries an upwardly extending rod 306 having threaded on its upper end a stop nut 307. The chamber member 301 has an integrally formed spider 308 extending thereacross, and with a central aperture 310 for passage of the shaft 306. Oil is initially poured inside the cylinder 300, and flows down to the bearings 230, and also flows downwardly through the passageway 236 in turbine shaft member 231 to fill in the hollow space inside turbine shaft 205. This oil escapes through oil holes such as 314 in the turbine shaft to lubricate the turbine shaft bearings. The oil also escapes from the hollow turbine shaft through a port 315 to enter the top end of drive shaft housing tube 280 which it fills down to the head 113 at the top end of the vibrator. This oil within the housing tube 280 lubricates the transmission shaft bearings 296. The purpose of the telescopic arrangement of the chamber member 301 when in the cylinder 300 is to provide for expansion of the oil body contained within the apparatus with temperature rises during operation.

Lubrication of the vibrator 87 is taken care of by simply introducing a suitable quantity of oil inside the housing space 142 at the time of initial assembly. This oil is splashed about by the rotors in such a way as to assure lubrication of all of the rotors and shaft bearings within the vibrator.

In operation, the usual mud fluid employed in drilling operations is delivered by mud pump 58a, and the previously described conventional fittings, to the hollow drill pipe string 75, whence it flows downwardly to and through sub 85, casing 182, and through the fluid passageways in spider 191, to the first turbine unit 201. The mud fluid passes through the rotors and stators of the several turbines in an axial direction, setting the turbine rotors, and the turbine shaft 205, into continuous rotation at a speed determined by the rate of mud flow as governed by the speed of operation of mud pump 58a. The mud delivered downwardly from the last turbine unit is received by the fluid passages 250 through the coupling spider member 221. At this point, some of the mud fluid can, if desired, be discharged to the bore hole, particularly in cases where a large mud flow rate is required for the drive of the turbines. Thus, mud fluid discharge ports 316 may be employed for discharge of any excess mud fluid. In any event, sufficient mud fluid to serve the usual functions in oil well drilling will flow downwardly through the fluid passages 250 in coupling spider 221, to be received by corresponding fluid passages 277 in coupling spider 265 immediately below. The mud fluid then passes downwardly in the annular space between drive shaft housing 280 and casing 89, passing the coupling 260 by way of the passageways 288 in the spider 285. At the coupling between the lower end of casing 89 and vibrator casing 100, the mud fluid passes downwardly through the fluid passages of the coupling spiders 105 and 102, thence being received in the passageways 143 at the two sides of the rotor enclosure. At the lower end of the vibrator casing 100, the fluid is discharged downwardly from the passages 143 into and through the sub 83, from which it passes in succession through the several drill collars 82 making up the vibratory rod 81. Finally, this mud fluid, having reached the interior of bit 80, is discharged to the bore hole by way of the laterally opening ports 98.

The mud fluid accordingly drives the turbines, which rotate the elongated transmission shaft 281 and the vibrator drive shaft 122. Rotation of this vibrator drive shaft 122 operates through bevel gears 123 and 124 and the previously described spur gears to drive the eccentrically weighted rotors in a manner heretofore explained, whereby a cyclic or alternating force is generated in a direction longitudinally of the apparatus and is transferred to the vibrator casing 100, thence to the longitudinally vibratory elastic drill collar rod 81, and from the latter to the bit. The drill rod 81 does not, however, vibrate bodily. The turbines are driven by the mud stream at a speed to operate the vibrator at a longitudinal resonant frequency of the rod 81, causing the rod to exhibit a longitudinal standing wave pattern of vibration characterized (assuming the simple case of fundamental frequency operation) by a substantially stationary center portion, and opposite end portions which vibrate in a longitudinal direction. The bit connected to the lower end of the rod is therefore vibrated longitudinally against the formation. Preferably, the drill string is at the same time slowly rotated by means of the rotary table, but this is not for the purpose of rotary cutting, but rather to permit the bit to work progressively over the area of the hole bottom.

The alternating force previously described as exerted on the upper end of the rod 81 by the turbine driven vibrator sends alternating elastic deformation waves of compression and tension traveling down said rod with the speed of sound. Reaching the lower end of the rod (and, of course, the bit), these waves are reflected to travel back up the rod, to be again reflected by the upper end of the rod, and so on. If the upper end of the rod is effectively "terminated," i. e., "isolated" from the equipment above, the upwardly traveling waves will be reflected at the top end of the rod, to retraverse the rod in a downward direction, and so on. Such termination or isolation may be accomplished by introduction of a flexible member between the rod and the equipment above, or by employment of a substantial change in cross-section, or both, the principal purpose being to introduce a compliant member or section between the vibratory rod and the suspending pipe string above. In the embodiment of Figures 1 to 10, the vibrator 87 must be regarded as a part of the vibratory system, since its mass per unit length is sufficiently close to the mass per unit length of the rod that wave reflection will not be sufficiently complete below the upper end of the vibrator. However, the casing 89 and transmission shaft housing tube 280 are sufficiently thin-walled to function as a compliance or flexible coupling possessed of sufficient flexibility to effectively isolate the vibratory rod and generator from the equipment above. It will be noted that the splined connection between the transmission shaft 281 and the vibrator drive shaft prevents transmission of longitudinal vibratory energy upwards through the shaft 281. It may now be appreciated that not only the vibratory rod 81, but also the vibrator 87, and indeed the bit 80, must be regarded as forming parts of the longitudinally vibratory system, and the overall length of these intercoupled members is, in effect, the fixed length of the vibratory "rod." Some small leakage of vibratory energy will of course inevitably take place from the upper end of the vibrator 87 up the relatively thin-walled casin 89 and housing tube 280, but this leakage is small in proportion, and in any event, is further handled in a manner to be set forth hereinafter. Thus, as may now be seen, when I refer to wave reflection at the ends of the vibratory elastic rod 81, I have in mind the fact that the effective length of the rod 81 includes not merely the drill collars 82, but the vibrator 87 and bit 80 as well.

In accordance with the established theory of longitudinal elastic waves in elastic rods, if the alternating driving force acting on the upper end of the rod has a frequency substantially equal to the fundamental resonant frequency of the rod, the above-mentioned alternating deformation waves of compression and tension traveling up and down the rod, being reflected from the two ends thereof, will cancel upon meeting at the midpoint of the rod but will be additive at the end portions of the rod. The mid-section of the rod hence stands stationary, though it nevertheless undergoes a stress cycle. This condition at the mid-point of the rod is known as a velocity node (region of minimum deformation amplitude); it is also known as a stress antinode (region of maximum cyclic stress amplitude). The two half-sections of the rod alternately elongate and contract, the extreme end portions of the rod having the maximum amplitude of motion, and the condition of maximum deformation amplitude at these end portions is known as a velocity anti-node. This type of phenomena is known as a longitudinal standing wave, one-half wave in length, in this instance. The velocity wave is of course always 90° out of phase with respect to the wave of displacement. The system is usually and preferably operated with the generator frequency in the range of resonant amplification of the rod 81, but slightly on the low side of the peak of the resonance curve.

It is important to recognize that the described standing wave condition is obtained when the alternating driving force is generated at a longitudinal resonant frequency of the rod, either the fundamental, or some harmonic. By employing a resonant frequency driving force, the amplitude of vibratory movement of the end portions of the rod becomes very greatly amplified, reflecting the fact that force consuming vibratory masses of the system have been "tuned out," and that force delivery at the bit has been commensurately improved.

In the embodiment of Figures 1 to 10, the vibratory rod has been described as typically composed of three 40 foot drill collars coupled together, giving a rod length of 120 feet. The resonant frequency for this rod length is in the range of 60 cycles per second, and I have successfully drilled in hard unweathered California granite using such a rod length and frequency. I have also successfully drilled in the same formation using a double length rod, 240 feet, and the same vibration frequency, the rod then vibrating at its first overtone.

In practice, the elastic rod 81 may be variously shaped, often tapered from one end to the other, as hereinafter described, or it may carry a "lumped" mass near one end, or by pressural engagement with the "work," it may become partially coupled to the work and behave as though some part of the work were moving with the rod. Under such practical conditions the resonant frequency may be somewhat lowered, and the wave length lengthened, causing the velocity and pressure anti-nodes to become shifted somewhat. Thus the pressure anti-node may be displaced downwardly, and the lower end of the rod, while having a substantial degree of oscillatory movement, may no longer be a substantially pure velocity anti-node region, but may have some degree of stress cycle along with its oscillatory movement. The upper end of the rod will normally remain a velocity anti-node region. It is seen that while the expression $S/2L$ (where $S$ is the speed of sound in the rod and $L$ is the length of the rod) may define the theoretical resonant frequency for the funamental frequency standing wave action, in practice, some departure is likely. In general, to establish a fundamental frequency standing wave, the necessary frequency will be substantially $S/4L$, or greater, and it can be found by varying the frequency of the alternating driving force in the region from $S/4L$ to $S/2L$, or at whole multiples thereof, until resonance is made manifest by strongly amplified elastic vibration of the rod. This condition can be accurately detected by an electronic microphone M, see Figure 2, in contact with some vibratory member at the well head, e. g., the circulation head, or its goose neck, and feeding an electronic frequency and amplitude indicator I.

In this invention, by the term resonance or resonant frequency I do not refer necessarily to the frequency for peak resonance, but rather to the frequency ranges for substantial resonant amplification of vibration amplitude. Also, it may be necessary to distinguish between the resonant frequency while uncoupled from the work and the resonant frequency while drilling. It is of course the latter that is important.

In drilling, the bit is first brought into a degree of initial pressural engagement with the bottom of the bore hole by lowering the drill pipe until a proportionate part of the weight of the assembly is borne by the formation. Operation as described is then initiated. Under these conditions the formation evidently undergoes a substantial degree of forced elastic vibration with the bit. The formation gives way under the high stress cycle thereby exerted upon it, and its failure is attributed largely to elastic fatigue failure.

The drill as thus described and operated is a powerful tool, and particularly because of the attention to impedance adjustments from prime power source all the way to the formation, the bit is capable of vibration with strokes of extreme power. Under these conditions, the longitudinally vibratory drill, particularly the downwardly projected area of the bit, becomes a generator of powerful sound waves in the surrounding drilling mud. These waves consist of alternating waves of compression and rarefaction, generated in the mud by the vibratory drill, and transmitted up the column of drilling mud. In this way, substantial vibrational energy leaks from the drilling system into the surrounding mud fluid, reducing materially the vibratory energy applied by the bit against the formation. The present invention deals with the provision of means for reducing this energy loss from the vibratory drill and consists in equipping the drill with a means for acoustically decoupling the vibratory drill from the mud fluid. By the expression "acoustic decoupling" I have reference to means for interfering with the natural close acoustic coupling between the vibratory drilling apparatus and the drilling fluid. The invention may be best understood by realizing first that the described drilling apparatus, surrounded by drilling mud is, without counter-provisions, acoustically coupled quite closely to the drilling fluid, being capable of setting up therein sound waves of substantial intensity and energy content. The present invention consists broadly in breaking or materially reducing this "coupling," and several illustrative decouplers will be described.

Figure 10 shows one of my sound wave decoupling devices in accordance with the invention. This decoupler is in the form of an inverted cup or bell 311 joined to the upper portion of the bit shank and extending downwardly toward the bladed portion of the bit. This inverted cup or bell traps an air or gas body inside it, so as to act as a surge chamber, and effectively prevent vibratory "drive" of the surrounding drilling mud by the vibrating bit. Air is introduced into the mud fluid at the ground surface, either by opening an air intake vent in the suction side of the mud pump, or by injecting compressed air into the mud on the discharge side of the mud pump. This entrained air tends to be released from the mud fluid upon discharge from the bit, and a part thereof is trapped by the bell 311. The gas body so trapped by this bell or surge chamber is readily compressible to accommodate cyclic surges of the mud fluid during vibratory operation of the drill, and cyclic surging of the mud fluid within this bell against the trapped gas body takes the place of otherwise substantial cyclic compression of the mud which would result in generation of sound waves in the column of mud fluid surrounding the drill string. The lower end of the vibratory rod and the bit are thus to a substantial extent acoustically decoupled from the surrounding mud fluid, and loss of vibration energy to the surrounding mud is materially curtailed.

The decoupler 311 shown in Figure 10 is located immediately adjacent the bit at the lower end of the drill collar, which is the source of the sound wave disturbance. In general, it is a requirement, for prevention of sound wave generation in the drill fluid, that the decoupling means be located well within one-quarter wave length, measured in the drill fluid, from the source of the disturbance, and preferably something of the order of one-eighth wave length thereof. Since the speed of sound in the drill fluid is only about one fourth that in the steel drill rod, a quarter-wave length in the drill fluid is almost one-quarter of a quarter-wave length measured along the drill rod. With half wave operation, and a rod 120 feet in length, a quarter-wave length in the drill fluid becomes a distance of about 15 feet. In accordance with the invention, therefore, to materially reduce or prevent acoustic drive of the drill fluid by the vibrating bit, the bell 311 should be well within this 15 foot distance, and preferably not over about seven or eight feet. As illustrated, where the bell is directly on the shank of the bit, this requirement is fully met.

Figure 11:
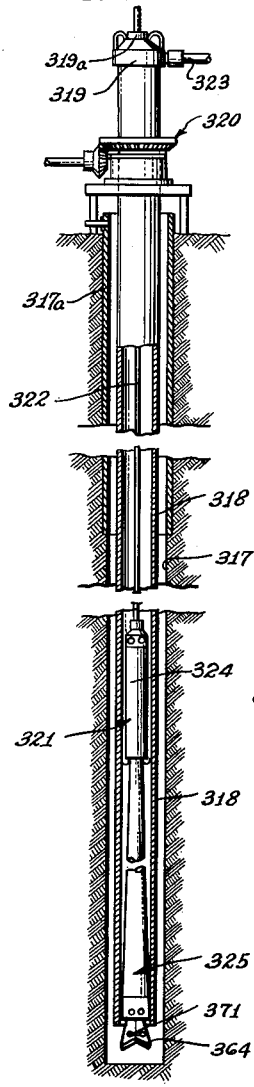
Figure 11 is a diagrammatic, partly elevational, and partly sectional, view of another embodiment of the invention.
Figure 12:
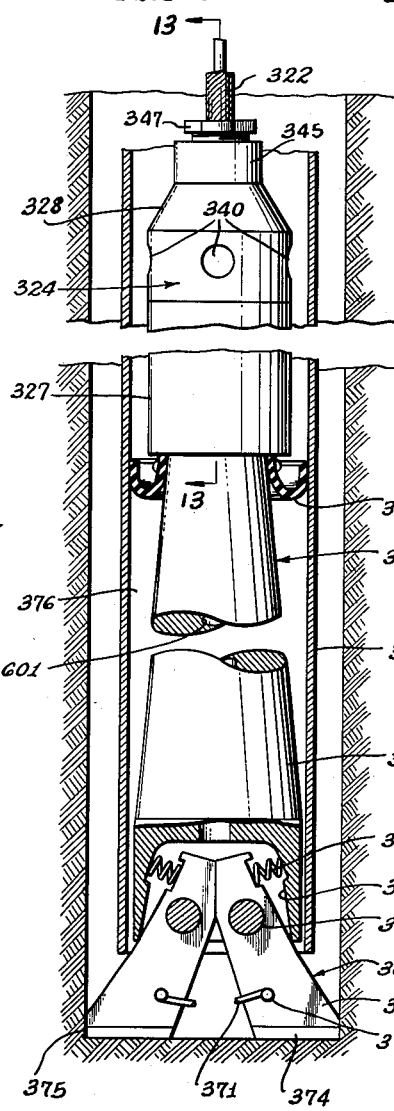
Figure 12 is an enlarged view showing the drilling assembly proper of the embodiment of Figure 11, with the bit members expanded.
Figure 13:
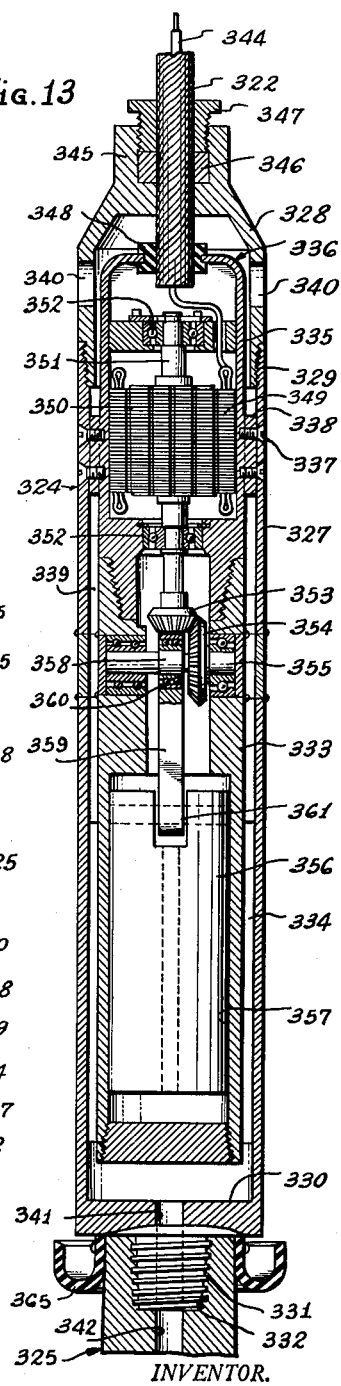
Figure 13 is a section taken on line 13—13 of Figure 12.

Figures 11, 12 and 13 show, to some extent in diagrammatic form, a modified embodiment of drill in accordance with the invention, incorporating several further mud decoupling features. Referring to Figure 11, the well bore is designated generally by the numeral 317, and the usual surface casing at 317a. A pipe 318 is suspended in the well bore, and this pipe is larger than ordinary drill pipe, preferably in the region of the small sizes of well casing. At the top of the pipe 318 is a swiveled circulation head 319, and the latter together with the pipe 318 may be suspended from the derrick in any usual manner, as for instance by use of any suitable suspending means engageable with the bails of the swivel 319. A usual rotary table, diagrammatically indicated at 320, is provided with conventional slips to engage the pipe 318. This table is employed for imparting slow rotation or rotary oscillation to the pipe 318 during drilling.

The drilling assembly proper is designated generally by numeral 321, and is suspended in pipe 318 by means of cable 322 which enters pipe 318 through a packing gland 319a at the top of circulation head 319. Drilling mud is supplied to pipe 318 through mud hose 323 connected to the circulation head.

The drilling assembly proper consists of elastic vibration generator 324, elongated massive elastically vibratory rod 325, here shown as of a tapered type, with a downwardly increasing cross-sectional area, and bit 364 connected to the lower end of rod 325.

The vibration generator 324 in this instance of a modified type employing an electric motor oriented on a vertical axis, and an inertia member linearly reciprocated by said motor along a direction line longitudinally of the drilling string. Generator 324 has an external cylindrical case 327, which includes a top 328 screwed to the cylindrical side wall portion of the case by coupling joint 329. At the bottom, the case 327 has a bottom wall 330 formed with a coupling pin 331 screwed into the threaded box 332 at the upper end of the vibratory rod 325. Annularly spaced inside generator case 327 is a relatively massive inner housing 333, connected to case 327 by mounting webs 334. Screwed to the upper end of this housing member 333 is the cylindrical housing 335 of an electric drive motor 336, arranged with its axis of rotation concentric with the longitudinal axis of the drill string. This motor housing 335 is also annularly spaced inside casing 327, and may be fastened thereto by means of screws 337 engaging lugs 338 projecting from the motor housing. Sufficient annular space 339 is provided between the casing 321 and the assembly of motor case 335 with housing 333 to permit the passage of drilling mud fluid supplied to the upper end of the casing through intake ports 340, and this annular space 339 communicates below the lower end of housing 333 with a port 341 in the bottom end of casing 327 opening into the longitudinal mud fluid passage 342 in the vibratory rod 325. The top 328 of the generator casing 327 is equipped for passage of the supporting cable 322, and this supporting cable consists of a multi-strand steel wire line having an insulated electrical conductor 344 running concentrically therethrough. A packing gland 345 in the casing top 328 contains a metal fiber packing 346 which is compressed and expanded by means of packing nut 347 to secure the drilling assembly tightly to the cable 322, so that the entire drilling assembly is thus supported from the cable.

As here shown, the cable 322 extends inside the upper end of motor case 335, being sealed at its point of entry by means of rubber grommet 348, and the electric conductor 344 extends down to connect with the field winding of the stator member 349 of the motor 336. The armature 350 of the motor has its vertical shaft 351 supported in bearings 352 above and below the armature, and the lower end of the motor shaft carries, below lower bearing 352, a bevel gear 353. This bevel gear 353 meshes with a larger bevel gear 354 mounted on a transverse shaft 355 which is rotatably supported in housing 333 by means of anti-friction bearings as indicated. A relatively heavy cylindrically shaped piston-like inertia weight or mass 356 is suspended within a cylindrical cavity 357 in the lower portion of housing 333 from an eccentric 358 on shaft 355 by means of a connecting rod 359. Connecting rod 359 is provided at its upper end with a strap containing an anti-friction bearing 360, in which eccentric 358 freely rotates, and is pin jointed at 361 to the inertia weight or mass 356 so that the rotation of shaft 355 by motor 336 through reduction gears 353 and 354 will impart to the weight 356 a longitudinal reciprocation determined by the throw of eccentric 358. The alternating acceleration and deceleration of the reciprocating weight 356 results in cyclic reactive forces being transmitted through the eccentric drive and the shaft 355 to housing 333, and thence, via mounting webs 334, to the outside casing 327, to be transmitted by said casing and exerted upon the upper end of vibratory rod 325.

The linear, longitudinal reciprocation of the weight 356 thus results in the exertion of an alternating force on the upper end portion of the vibratory rod 325, as in the embodiment earlier described. The reduction gears 353 and 354 along with the reciprocating weight 356 and eccentric 358 furnish a velocity reduction and a force gaining mechanism between the moving power receiving member of the motor, i. e., its armature, and the point of connection of the generator casing to the vibratory rod 325. In order to have a sufficiently powerful electric drive motor, which is small enough to be capable of installation within the relatively limited space available for it, it must be of a high displacement type. That is to say, it must be of a type having a relatively high product of armature velocity and armature area. In practice, this requirement is fulfilled by a relatively small commercially available electric motor developing high speed, though relatively low torque. The high speed and low torque, however, are converted through the described velocity reducing and force gaining device into high cyclic force but small stroke amplitude at the power delivery connection with the vibratory rod.

The amplitude of reciprocation of the weight 356 may exceed that of the housing 333 and connected vibratory rod 325, but not necessarily so. The greater the weight of the piston 356, the less need be its stroke amplitude and velocity; and if the weight of the piston 356 is sufficient, the throw of the eccentric 358 may be made very small, so that the amplitude of motion of the piston 356 would be even less than that of the exterior casing 327. Theoretically, the stroke amplitude of the weight 356 may approach zero as its mass approaches infinity. A relatively small, high amplitude, fast traveling oscillating weight 356, while of great practical advantage, is therefore not an essential.

The vibratory rod 325 may be of the usual coupled drill collar type already described, although I have shown in Figures 11–13 a tapered type having certain advantages to be explained hereinafter. The small end of the tapered vibratory rod is coupled to the lower end of the vibration generator, and the large end thereof carries the bit, designated at 364. A large section of the tapered rod 325 has been broken away in the drawings, but it will be understood that this rod is again of substantial length, as for instance 120 feet, and that it may be made up of sections screwed together by suitable couplings. The taper may be uniform from end to end, or modified in various ways, as for instance by successive stepwise enlargements.

The annular space between the vibratory rod 325 and the pipe 318 is sealed by a packer 365 of relatively stiff material. This packer is mounted on the drilling assembly at a point below the mud fluid intake openings 340, typically at the top end of the vibratory rod 325, and preferably is of the cup type with its outer edge folded upwardly so that downward mud pressure presses its outer edge into sealing contact with the interior surface of pipe 318.

The expansive bit 364 comprises a pair of outwardly and downwardly inclined bit members 367 having cutting edges at their lower ends and whose upper ends are received in a downwardly opening cavity 368 at the lower end of vibratory rod 325, the upper end portions of the bit members being pivotally mounted on horizontal pins 369 mounted in the lower end of the rod 325. Compression springs 370 mounted between the upper ends of bit members 367 and seats formed inside cavity 368 tend to spread the lower ends of the bit members 367 apart until their upper ends come into engagement as shown in Figure 16. As the drilling assembly is lowered in the well hole, the two bit members are held together, against the compression of springs 370, by a wire 371 tied at its ends to pins 372 on the bit members 367. When the bottom of the well hole is reached, the bit then being below the lower end of the pipe 318, the drilling assembly is dropped a short distance to bring the bit members heavily into engagement with the bottom of the well hole. The resulting shock snaps wire 371 and permits springs 370 to force the bit members 367 apart until their upper ends engage one another, as shown.

Thus it is possible to lower the drilling assembly within the pipe 318 by cable 322 with the bit members contracted. Upon release of the bit members, the drilling operation may be begun and the bit members will generate a hole of substantially larger diameter than that of the pipe 318. When it is desired to remove the drill assembly, the pipe 318 can be left in the hole because the bit members 367 can slide upwardly inside said pipe. In drilling with the system of Figures 11–13, the motor 336 of the vibration geenrator will be driven by electrical current fed thereto via cable conductor 344, and the motor operates at a speed to drive the reciprocating inertia member 356 of the vibrator at a longitudinal resonant frequency of the vibratory rod 325. An alternating force of resonant frequency is thereby exerted on the vibratory rod 325, setting said rod into longitudinal standing wave action as described hereinabove, and the bit members 367 are thereby caused to vibrate against the hole bottom. During such action, the rotary table supporting the pipe 318 may be slowly driven, either rotated, or simply oscillated by rotary drive. The packer 365 tightly sealed between the vibratory rod 325 and the pipe 318 causes the rod 325 to turn with the pipe, so that the bit slowly rotates along with its vertical vibratory action. Alternatively, since in practice the bit tends to rotate slowly owing both to engagement with the formation and jet action at the mud discharge ports in the bit, a swivel can be introduced in the rod or bit, at any point below the packer, and the bit will then rotate without operation of the rotary table.

The bit member 364 (Figure 12) has blade portions 374 which are preferably substantially horizontal in the expanded position, and outside edges 375 which are preferably substantially vertical in the expanded position. The vertical edges 375 tend to exert lateral forces on the sides of the bore hole immediately adjacent the hole bottom, and this lateral pressure appears to set up stresses in the formation tending to favor elastic fatigue failure of the formation.

The discussion of the invention given immediately following the description of the embodiment of Figures 1 to 10, applies also to the embodiment of Figures 11–13, and need not be repeated.

The apparatus as shown in Figures 11–13 also has certain novel acoustic mud decoupling features. First, the cavity 368 in the lower end of the vibratory rod 325 forms an inverted cup or bell which collects a body of air or gas, so as to act as a surge chamber, and prevent effective "drive" of the drilling mud by the lower end of the vibratory rod 325 and the bit. Here also, I supply air or gas to the mud fluid at the ground surface to supply these gas collecting pockets. The mud fluid with the entrained air, upon discharge from the circulation bore 601 into the cavity 368, experiences a velocity reduction which is conducive to release of a large proportion of the air for collection in the cavity 368. In addition, the annular space 376 between the elastic rod 326 and the pipe 318, below packer 365, forms an air or gas pocket, tending to collect a body of air or gas, and tending to isolate the entire length of the vibratory rod 325 from the mud fluid column outside. This feature accordingly also functions to provide a gas body that is readily compressible to accommodate cyclic surges of the mud fluid during vibratory operation of the drill. In addition, prevention of the mud fluid from flowing up around the length of the vibratory rod 325 prevents vibratory drive of the mud fluid by the vibratory action of the lateral suraces of the rod itself, and so aids very materially in acoustic decoupling. Attention is also directed to the downwardly facing annular shoulder at the juncture of generator case 327 with the reduced upper end portion of rod 325, and which, if the generator should be comparable in length to a quarter wavelength, is a potential source of sound wave radiation. It will be seen that this potential source is also acoustically decoupled from the mud fluid above the cup leather 365 by the gas space 376. These several features thus contribute to acoustic decoupling of the vibratory rod and bit from the drilling mud surrounding the drill string, tending, first, to keep the drilling fluid away from certain areas of vibratory parts, and second, providing surge chambers wherein collected air or gas bodies can cyclically compress sufficiently to accommodate cyclic displacement of the mud fluid and thereby prevent transmission of pressure surges up to the mud column around the outside of the equipment.

Figures 14 and 15 show a further form of the invention, incorporating further forms of acoustic decoupling means. The usual elongated vibratory rod, typically composed of drill collars, is here designated generally by numeral 400, and to the lower end of said rod is coupled a bit 401, described in more particular hereinafter. The vibration generator assembly or combination may be of various types, but for simplicity may be considered to be of the same general type shown in Figures 1 to 10. Thus, the upper end of drill collar rod 400 may be coupled by coupling 402 to the lower end of vibrator 403, which may be of the same general nature as the vibrator 87 of the first-described embodiment. Above vibrator 403, and connected thereto by transmission shaft casing 404, is the motor or turbine unit 405, and it is to be understood that these components may be similar to the corresponding members 89 and 88 of the first-described embodiment, with the exception that the transmission shaft unit 404 is here made short, and consists of a single short member, rather than two long sections connected together. The turbine unit 405 is therefore, in this case, close spaced to the vibrator, and is subject to longitudinal vibration.

The upper end of turbine unit 405 has connected to its upper end a sub 406, which has a reduced tubular portion 407 at its upper end. Intercoupled between this reduced tubular portion 407 of sub 406 and the drill pipe string 408 above is a device 410 having two separate important functions, first, insulation of the vibratory drilling assembly below from the pipe string 408 above, whereby to prevent escape of vibratory energy up by the drill string, and second, acoustic decoupling of the vibratory drilling apparatus from the drilling mud in the bore hole surrounding the vibratory drilling apparatus. This device 410 comprises two tubular members or sleeves, the lower of which is the aforementioned tubular member 407, and the upper of which is indicated at 411. These sleeves are arranged end to end, but with a spacing distance therebetween. The upper end of upper sleeve 411 has a threaded box 412 for reception of the threaded pin on the lower end of drill pipe string 408. A resilient sleeve 415, typically rubber, surrounds portions of both sleeves 407 and 411, as illustrated, and is in turn surrounded by a steel sleeve 416. The rubber sleeve 415 is vulcanized to the outsides of the two sleeves 407 and 411, and also to the inside of the sleeve 416. The steel sleeve 416 is welded at the top to a flange on the upper end of sleeve 411.

When the drill is in operation, and the vibratory rod 400 undergoes its vibratory action, the rubber connecting sleeve 415 functions as a shock and vibration absorbing and insulating means, isolating these vibrations from the drill string 408 above. In addition, the rubber sleeve 415 within the outside sleeve 416 forms a piston and sleeve assembly, having an important acoustic mud fluid decoupling function. Cyclic pressure pulses in the surrounding mud fluid resulting from the vibratory action of the system ending at member 415 is prevented because the upper end surface of member 415 moves within sleeve 416 much like a piston in a cylinder. The sleeve 416 thus is a sort of jacket which maintains room for the displacement of member 415 on each cycle, and pressure pulses in the mud fluid from this source are accordingly prevented, thus avoiding sending substantial energy-consuming wave trains into the drilling fluid. Sound wave generation owing to fluid drive by the lower end 415a of sleeve 415 is cancelled because of the upwardly facing area of the offset portion 406a of adapter 406. Tendency for fluid drive by the differential of vertically projected areas of 415a and 406a is prevented by a yielding displacement of the resilient body 415, inwardly of its surrounding jacket sleeve 416 in response to external drill fluid cyclically displaced by said differential area, so as to accommodate or provide room for such displaced fluid.

Referring back to Figure 1, it can be seen that casing 89 very nicely provides the additional function of mud decoupling at the upper end of the vibrating assembly because its smooth exterior completely avoids the existence of a vibrating shoulder such as 406a.

The bit 401 shown on the lower end of the drilling apparatus in Figures 14 and 15 incorporates certain important acoustic decoupling features. This bit 401 has not only an inverted cup or bell 401a, like that described in connection with the bit on the embodiment of Figures 1 to 10, but also a lost motion device by which the blades of the bit are maintained constantly in engagement with the hole bottom. The bit shank 420 has a reduced end portion 421 telescopically received within a socket 422 formed at the top of a lower or formation engaging portion 423 of the bit, the latter being typically formed with blades or wings as desired. A compression spring 424 accommodated within a socket 425 extending upwardly into shank 420 and seating at its opposite ends in the bottoms of sockets 425 and 422 tends to maintain the formation engaging member 423 in a position of downward extension relative to the shank portion 420. Pins 426 extending laterally from the shank part 421 are received in vertically elongated slots 427 in the collar of the member 423 to limit the amount of relative telescopic movement in the opening direction between the bit shank 420 and the formation engaging portion 423 of the bit.

The lower formation engaging portion 423 of this bit is held constantly against the hole bottom under spring pressure. The shank of the bit directly connected on the lower end of the vibratory rod 400 cyclically impacts against the lower bit portion 423 by engagement of its annular shoulder 428 against the anvil afforded by the upper end of the collar portion of the bit part 423. The formtion engaging part 423 of the bit, being held in engagement with the formation under spring pressure, is enabled to vibrate with the formation without separating therefrom. This device thus assures continuous contact between the bit and the formation. The mud fluid is accordingly prevented from working in between the blades or wings of the bit and the formation at the hole bottom. When the mud fluid is permitted to come between the bit and the hole bottom, a certain loss of energy results because the bit must first displace the mud fluid and then strike the work. Movement of the mud fluid to and fro into and out of the space between the bit and the formation actually can represent a substantial energy loss from the system, and this energy loss is materially reduced, if not eliminated entirely, by the present bit. Also, of course, this embodiment provides a very desirable degree of decoupling for the lower end of the vibratory rod because the displacement of the cross-sectional area of annular shoulder 428 is isolated within the bit member.

Figure 16 shows a further acoustic decoupler in accordance with the invention, such as may be used, for example, with the drilling apparatus of Figures 1–10. The apparatus of Figures 1–10, without the specific bit there shown, may be taken together with the bit of Figure 16 to show a complete sonic drilling system, employing the specific type of decoupler of Figure 16. Here, the lower end portion of the vibratory drill collar is indicated at 450, and coupled to the lower end thereof is a fitting 451 comprising a solid head portion 452 at the top, and a hollow shell portion 453 at the bottom. Projecting downwardly from head portion 452 is a centrally disposed stem 454, which terminates just above the lower end of shell portion 453. A circulation bore 455 extends downwardly through the head 452 and through the stem 454 to angularly disposed discharge ports 456 at the lower end of stem 454. Welded to the lower end of shell 453 are crossed bit bars 457, and it will be evident that the mud fluid discharged by the ports 456 will jet out through the space between the bit bars and the lower end of the shell 453.

An opened bottomed cavity 460 will be seen to be formed inside shell 453 and around stem 454, and this cavity is packed with a body 461 of gas-filled grease, such as is known in the lubrication art. Such grease is referred to in the art as a stabilized suspension of gas bubbles in grease, and the body 461 of this gas-filled grease within the cavity 460 forms a compressible body therein. This body of grease is confined within the cavity 461 by means of a flexible rubber fabric diaphragm 462, secured to stem 454 as by means of clamp 463, and to the inner surface of shell 453 by means of a supporting band 464 and studs 465.

In operation of the drill equipped with the device shown in Figure 16, cyclic pressure surges generated in the mud fluid by the vibratory bit on the drill collar rod act through the diaphragm 462 against the gas-filled grease body 461, causing the same to alternately contract and expand. In this way, the body 461 functions as a displaceable body which relieves the pressure surges otherwise set up in the drilling mud by the vibratory action of the bit. Sound wave generation in the mud fluid is curtailed accordingly. The displaceable body 461 does not consume any substantial amount of energy, and functions essentially in a manner similar to the gas-filled surge chamber heretofore described in connection with the bit of Figure 10.

It has heretofore been pointed out that the acoustic mud fluid decoupling means of the present invention is particularly needed and of particular efficacy in connection with my preferred sonic vibratory drilling apparatus, especially in view of its impedance adjustment features which make it especially prone to deliver substantial energy flow from the prime mover into the mud fluid. I also wish it to be understood, however, that the mud fluid decoupler of the present invention is applicable with appreciable benefit to longitudinally vibratory drilling systems which may be in some respects similar to mine but wherein attention has not been paid to impedance adjustment, or in other words, wherein my velocity reduction feature has not been adopted, since a substantial proportion of what energy is available for drilling with such drills can also be lost into the drill fluid. In fact, my invention is applicable to and useful with any drill having longitudinal vibration with such frequency, amplitude and displacement characteristics as will result in an acoustic coupling to the mud fluid in sufficient degree to bleed off a significant amount of energy, and there are many drills which fall into this category. For instance, a body reciprocating bar whose length is at least of the order of one-eighth of the wave length generated in the mud by the frequency of the bar's reciprocation will be aided by decoupling, and the degree of benefit increases with increase in the length of the bar beyond one-eighth wave length. This is also true of a reciprocating drill having a large diameter plunger running in and out of a cylinder with sufficient stroke and frequency rate.

In general, in order to properly locate the decoupler, the disturbance point, i. e., source of sound wave drive of, or radiation into, the drill mud, should first be identified; and then, the acoustic decoupler is incorporated in connection with the drilling apparatus at a location substantially less than one-quarter wave length of the generated wave (measured in the mud fluid) from the potential source point, or point of potential wave generation. No significant wave will then be generated by the potential wave source. In all practical effect, the potential wave source is no longer a wave generator. It will be seen that proper location of the decoupler requires knowledge of the vibration frequency of the drilling apparatus, and of the approximate speed of sound waves in the mud fluid, so that a quarter-wave length distance can be ascertained by employing the usual expression $$\lambda = \frac{S}{f}$$

where S is the speed of sound in the medium under consideration (the mud), $f$ is the frequency of the wave, and $\lambda$ is the length of the wave in the medium. To ascertain the speed of sound in the mud fluid, a batch of the mud fluid can be pressurized at the ground surface to a degree duplicating deep well conditions, and the speed of sound then measured in the mud under those conditions, using well known techniques.

Figures 17 through 19 illustrate a conventional type of earth boring apparatus, equipped with a conventional bit of the roller cone type, and provided with acoustic mud decoupling means in accordance with the invention. Numeral 500 designates the lower end portion of a conventional drill collar, to the lower end of which is coupled a sub 501 carrying the acoustic mud decoupler, designated generally by numeral 502, and to the lower end of this sub 501 is coupled conventional roller cone bit 503. Mud circulation passageways 504 and 505 in collar 500 and sub 501 lead to the usual circulation passage 506 in the shank of bit 503, the mud fluid being discharged at the lower end of the shank 503 by way of ports 507. The lower end of bit 503 carries a plurality of roller cones 508 having the usual cutter teeth 509.

The periphery of sub 502 is formed with longitudinal circumferentially spaced grooves or channels 510, circular in cross section, and opening through the sides of the sub 501, as clearly shown in the drawings. Received in these channels 510 are pneumatic cells 512 consisting of long rubber tubes fitting nicely within the channels 510 when inflated. The cells 512 are equipped at the top with valve stems 514 for inflation purposes.

In Figure 19, a toothed roller cone 508 is diagrammatically represented in three successive positions, the line 515 representing the bottom of the drill hole. In the first position, two of the cutter teeth 509 are in engagement with the hole bottom. In the second position, the cutter has turned a short distance on its axis, bringing a single cutter tooth 509 into engagement with the hole bottom, and it should readily be evident that in this position the cutter, as well as the drill cutter above, will be elevated by a short distance as compared with the first position, this following from the fact that the distance from the crest of a cutter tooth to the center of rotation of the cone is greater than the distance from a line drawn between the crests of two cutter teeth and the center of rotation of the cone. Accordingly, in the second position illustrated in Figure 19, the cone, and therefore the drilling apparatus, is elevated slightly relative to the first position. Beyond the second position, the drill collar and cutters should drop back to the first position, in order for the next tooth to impact against the rock. It will be seen that the cutters or cutter teeth comprise vibration generating means which longitudinally vibrate the bit and drill collar. The third position in Figure 19 represents, however, a condition often encountered in practice, with the cutters actually separated from the hole bottom by a short spacing distance, and in such condition, of course, the drill is for the time being inoperative. The way in which this condition illustrated in the third position of Figure 19 can occur in practice will be described presently.

A cone type of bit such as shown in the embodiment of Figures 17 through 19 can rotate against the hole bottom at a speed resulting in a frequency of cutter engagement with the hole bottom approximating, for example, 2000 cycles per minute. This means that the drilling apparatus, including collar 500, sub 501 and bit 503, will have a longitudinal vibratory action at a frequency of 2000 cycles per minute. Under such circumstances and on the assumption that the combined bit and drill collar have a determined length of at least a quarter wavelength of a sound wave in the drilling fluid at such frequency, the downwardly projected area of the bit couples acoustically to the surrounding mud fluid and tends to generate therein sound waves which travel up the mud fluid surrounding the drill string toward the ground surface. These waves travel in the mud fluid at a velocity, for example, of 2000 feet per second. In practice, when a drilling apparatus of the type shown in Figure 17, but not equipped with acoustic mud decoupling means, is in operation in a mud filled drill hole, substantial sound wave generation may thus occur. The source of sound wave generation may be considered to be the downwardly facing surface area on the bit, and this surface area being in pressure engagement with the mud fluid owing to the sound waves which are being generated in and transmitted up the column of mud fluid, the lower end of the bit is subjected to cyclic mud fluid pressure sufficient to partially or wholly support the drilling apparatus. In some instances the cone may actually, under such conditions, clear the hole bottom entirely, as represented in the third position of Figure 19. The drilling apparatus simply "rides" in the mud.

The pneumatic cells 512 form yieldable or resilient bodies which yield inwardly, or are compressed, upon reception of any pressure pulse in the surrounding mud fluid. These cells, or yieldable bodies, operate in practice to prevent sound wave generation in the mud fluid column, since any pressure wave tending to be created in the mud fluid is instantly relieved by contraction of the cells 512. The cells thus are responsive to any pressure pulse in the mud fluid to yield sufficiently to cancel the pulse. Being located immediately adjacent the bit, pressure waves which might otherwise be generated in the mud fluid by the action of the longitudinally vibratory bit are killed at the souce. The drill assembly thus has greatly enhanced freedom of reciprocation because it is no longer a generator of waves in mud, so long as the decoupler is associated therewith.

Assuming a frequency of cutter engagement with the hole bottom of 2000 cycles per minute, and a velocity of sound in the mud fluid equal to 2000 feet per second, the length of a full wave in the mud fluid is 60 feet, and a quarter-wave length is 15 feet. In accordance with the teaching of the invention, therefore, the cells 512 should be substantially less than 15 feet from the lower end of the bit, and it should be evident that this requirement is met in the embodiment of the invention illustrated in Figures 17 to 19.

In Figures 20 and 21 is shown an embodiment of my invention which is again of my impedance adjusted sonic type, but which has the novel characteristic that the elongated vibratory rod is supported at its base, its upper end being free, and in which the vibration generator is intercoupled between the lower end of said rod and the bit. From the standpoint of acoustic decoupling from the mud fluid, this embodiment has the characteristic feature that the vibratory rod is enclosed within a surrounding casing or jacket, and so completely isolated from contact with the surrounding mud fluid.

The elastic rod is designated in Figures 20 and 21 by numeral 560, and it will be understood that this member is again a long massive elastic member having a longitudinal mode of elastic vibration at a resonant frequency. The lower end of the rod 560 is mounted in a socket 561 in the end of an adapter 562. The vibration generator, designated generally by numeral 563, and which may be any of the types hereinabove indicated as suitable for my impedance adjusted type of sonic drill, or any of the types mentioned in my copending application Serial No. 200,277, is threadedly connected at its upper end to the adapter 562, and at its lower end to bit 564, as indicated at 565. The generator 563 is indicated in the drawings as being of a type driven by the flow of mud fluid through the apparatus, and provisions are shown in Figures 20 and 21 for drive of the generator by the mud fluid.

The lower end of a drill pipe string 570 is coupled by means of adapter 571 to the upper end of a cylindrical housing 572. A second cylindrical housing or jacket 573 encloses the rod 560 and isolates it completely from the mud fluid. This housing or jacket 573 is shown as threaded on the upper end of the adapter 562. The interior of jacket 573 is long enough to provide sufficient clearance at the ends and around the vibratory rod 560 to permit maximum elastic deformation of rod 560 without contact with the top or sides of the member 573. The jacket 573 is annularly spaced inside the exterior housing 572 in order to provide for mud fluid circulation therebetween and is externally supported by an internal annular flange 575 in the housing 572. This flange 575 is provided with circulation passages 576 for the mud fluid which enters the housing at its upper end from drill pipe string 570. The aforementioned adapter 562 has liquid inlet openings 577 communicating with the interior of vibration generator 563, and the liquid moving down inside the housing 572 accordingly enters these inlets and passes through the vibration generator to operate the motor means and vibrator within the same, being finally discharged from the bottom of the generator to exit by way of passage 578 in bit 564.

The vibratory rod 560 is shown in this instance to be made up of concentric steel sleeves 560a, and the friction between these sleeves damps bending action of the rod as a whole, and thereby combats undesirable lateral vibration. This action is further aided by the preferred employment of a viscous material, such as pitch, between the surfaces of the several concentric sleeves.

The embodiment of Figures 20 and 21 thus has two noteworthy features, complete acoustic isolation of the vibratory rod from the surrounding mud fluid, and the concentric sleeve arrangement designed to reduce any possible tendency toward lateral vibration. It will be seen that the embodiment of Fig. 20 is illustrative of a case in which the upper end of the vibratory rod, in this case the member 560, is a potential source of sound wave radiation in the mud fluid, and that the upper end of the rod has been decoupled from the mud fluid by the use of the decoupling means 573.

Various forms of acoustic mud decoupler have now been disclosed as illustrative of my invention, and there have been shown in connection with various forms of earth boring apparatus, some being of my impedance-adjusted sonic type, and some being of conventional type. It is to be understood that these decouplers may be used interchangeably on the various types of earth boring apparatus, e. g., the acoustically decoupled bit of Figure 15 is to be considered as equally usable on the drilling apparatus of Figures 1–10; the acoustic decoupler of Figure 16 may be used in a sonic drilling system, or in a conventional system, and the acoustic decoupler of Figures 17–19 may be used either in a conventional drilling system, or in a sonic system, for instance, that of Figures 1–10. It will also be understood that the specific embodiments shown are for illustrative purposes only, and that various forms and arrangements are within the scope of the invention as defined by the appended claims.

I claim:

1. Apparatus for drilling a bore hole in the earth, having in combination: an elongated massive elastic drill rod of fixed length, an elastic vibration generator assembly attached to said rod, said assembly embodying a mechanical vibrator having a fixed driving connection to said rod, said vibrator being operable to apply cyclic longitudinal vibration forces on said rod at the frequency of a longitudinal resonant elastic vibration of said rod, a bit drivingly coupled to the end of said rod to transmit forces from said rod to the earth formation below, said assembly also embodying a motor means having a power receiving member drivingly connected to operate said vibrator, said power receiving member receiving motor power transmitted down said bore hole for actuation from the earth's surface, and an acoustic mud fluid decoupler mounted on said apparatus at a spacing distance from said bit which is substantially less than a quarter wave length, measured in the drilling mud fluid, of the sound wave which the bit tends to generate in the surrounding drilling mud fluid.

2. Apparatus for drilling a bore hole in the earth, having in combination: an elongated massive elastic drill rod of fixed length, an elastic vibration generator assembly attached to said rod, said assembly embodying a mechanical vibrator having a fixed driving connection to said rod, said vibration being operable to apply cyclic longitudinal vibration forces on said rod at the frequency of a longitudinal resonant elastic vibration of said rod, a bit drivingly coupled to the end of said rod to transmit forces from said rod to the earth formation below, said assembly also embodying a motor means having a power receiving member drivingly connected to operate said vibrator, said power receiving member receiving motor power transmitted down said bore hole for actuation from the earth's surface, and acoustic fluid decoupling means including a cyclically displaceable body positioned in contact with said apparatus and with drill fluid in the bore hole, said body being located at a spacing distance from said bit which is substantially less than a quarter wave length, measured in the surrounding mud fluid, of a sound wave which said bit tends to generate in the mud fluid, and said body being cyclically displaceable at the longitudinal vibration frequency of said rod so as to accommodate cyclic displacement of the drill fluid by the longitudinal vibrations of said apparatus.

3. Apparatus for drilling a bore hole in the earth, having in combination: an elongated massive elastic drill rod of fixed length, an elastic vibration generator assembly attached to said rod, said assembly embodying a mechanical vibrator having a fixed driving connection to said rod, said vibrator being operable to apply cyclic longitudinal vibration forces on said rod at the frequency of a longitudinal resonant elastic vibration of said rod, a bit drivingly coupled to the end of said rod to transmit forces from said rod to the earth formation below, said assembly also embodying a motor means having a power receiving member drivingly connected to operate said vibrator, said power receiving member receiving motor power transmitted down said bore hole for actuation from the earth's surface, and acoustic fluid decoupling means including a resilient cyclically displaceable body positioned in contact with said apparatus and with drill mud fluid in the bore hole, said body being located at a spacing distance from said bit which is substantially less than a quarter wave length, measured in the surrounding mud fluid, of a sound wave which said bit tends to generate in the mud fluid, and said body being cyclically displaceable at the longitudinal vibration frequency of said rod in response to pressure surges received through the mud fluid from said bit so as to accommodate cyclic displacement of the mud fluid by the longitudinal vibrations of said apparatus.

4. Apparatus for drilling a bore hole in the earth, having in combination: an elongated massive elastic drill rod of fixed length, an elastic vibration generator assembly attached to said rod, said assembly embodying a mechanical vibrator having a fixed driving connection to said rod, said vibrator being operable to apply cyclic longitudinal vibration forces on said rod at the frequency of a longitudinal resonant elastic vibration of said rod, a bit drivingly coupled to the end of said rod to transmit forces from said rod to the earth formation below, said assembly also embodying a motor means having a power receiving member drivingly connected to operate said vibrator, means for circulating gas-carrying mud fluid through said drilling apparatus and out of said bit into the bore hole, and acoustic mud fluid decoupling means comprising a gas trap bell encircling and connected to the apparatus in the vicinity of said bit, said bell being positioned with its interior cavity exposed to gas-carrying mud fluid issuing from said bit, and being located at a spacing distance from said bit which is substantially less than a quarter wave length, measured in the fluid, of a sound wave which said bit tends to generate in the mud fluid.

5. Apparatus for drilling a bore hole in the earth, having in combination: an elongated massive elastic drill rod of fixed length, an elastic vibration generator assembly attached to said rod, said assembly embodying a mechanical vibrator having a fixed driving connection to said rod, said vibrator being operable to apply cyclic longitudinal vibration forces on said rod at the frequency of a longitudinal resonant elastic vibration of said rod, a bit drivingly coupled to the end of said rod to transmit forces from said rod to the earth formation below, said assembly also embodying a motor means having a power receiving member drivingly connected to operate said vibrator, said power receiving member receiving motive power transmitted down said bore hole for actuation from the earth's surface, and a jacket means connected to the apparatus surrounding an end portion of said elastic drill rod and acoustically isolating the same from fluid in the bore hole.

6. Apparatus for drilling a bore hole in the earth, having in combination: an elongated massive elastic drill rod of fixed length, an elastic vibration generator assembly attached to said rod, said assembly embodying a mechanical vibrator having a fixed driving connection to said rod, said vibrator being operable to apply cyclic longitudinal vibration forces on said rod at the frequency of a longitudinal resonant elastic vibration of said rod, a bit drivingly coupled to the end of said rod to transmit forces from said rod to the earth formation below, said assembly also embodying a motor means having a power receiving member drivingly connected to operate said vibrator, said power receiving member receiving motive power transmitted down said bore hole for actuation from the earth's surface, and a jacket means connected to the apparatus and acoustically isolating a vibratory surface of the apparatus from fluid in the bore hole.

7. Apparatus for drilling a bore hole in the earth, having in combination: an elongated massive elastic drill rod of fixed length, an elastic vibration generator assembly attached to said rod, said assembly embodying a mechanical vibrator having a fixed driving connection to said rod, said vibrator being operable to apply cyclic longitudinal vibration forces on said rod at the frequency of a longitudinal resonant elastic vibration of said rod, a bit drivingly coupled to the end of said rod to transmit forces from said rod to the earth formation below, said assembly also embodying a motor means having a power receiving member drivingly connected to operate said vibrator, and a velocity reducing means connected between said power receiving member and said rod so that said power receiving member travels at a greater linear velocity than the elastic deformation stroke velocity of said driving connection of said vibrator to said rod, said power receiving member receiving motive power transmitted down said bore hole for actuation from the earth's surface, said motor means and vibrator being of smaller lateral dimensions than the bore hole formed by the bit and being mounted in a fixed position relative to said rod to accompany said rod down said bore hole, and acoustic mud fluid decoupling means operatively associated with said apparatus for reducing wave energy dissipation into a surrounding column of drill fluid in the bore hole, said decoupling means including means for mounting on said apparatus in communication with drilling mud fluid in the bore hole at a spacing distance from said bit which is substantially less than a quarter wave length, measured in the surrounding mud fluid, of a sound wave which said bit tends to generate in said mud fluid.

8. Apparatus for drilling a bore hole in the earth, having in combination: an elongated massive elastic drill rod of fixed length, an elastic vibration generator assembly attached to said rod, said assembly embodying a mechanical vibrator having a fixed driving connection to said rod, said vibrator being operable to apply cyclic longitudinal vibration forces on said rod at the frequency of a longitudinal resonant elastic vibration of said rod, a bit drivingly coupled to the end of said rod to transmit forces from said rod to the earth formation below, said assembly also embodying a motor means having a power receiving member drivingly connected to operate said vibrator, and a velocity reducing means connected between said power receiving member and said rod so that said power receiving member travels at a greater linear velocity than the elastic deformation stroke velocity of said driving connection of said vibrator to said rod, said power receiving member receiving motor power transmitted down said bore hole for actuation from the earth's surface, said motor means and vibrator being of smaller lateral dimensions than the bore hole formed by the bit and being mounted in a fixed position relative to said rod to accompany said rod down said bore hole, and acoustic fluid decoupling means including a cyclically displaceable body positioned in contact with said apparatus and with mud fluid in the bore hole, said body being cyclically displaceable at the longitudinal vibration frequency of said rod so as to accommodate cyclic displacement of the mud fluid by the longitudinal vibrations of said apparatus, and being located at a spacing distance from said bit which is substantially less than a quarter wave length, measured in the surrounding mud fluid, of a sound wave which said bit tends to generate in said mud fluid.

9. Apparatus for drilling a bore hole in the earth, having in combination: an elongated massive elastic drill rod of fixed length, an elastic vibration generator assembly attached to said rod, said assembly embodying a mechanical vibrator having a fixed driving connection to said rod, said vibrator being operable to apply cyclic longitudinal vibration forces on said rod at the frequency of a longitudinal resonant elastic vibration of said rod, a bit drivingly coupled to the end of said rod to transmit forces from said rod to the earth formation below, said assembly also embodying a motor means having a power receiving member drivingly connected to operate said vibrator, and a velocity reducing means connected between said power receiving member and said rod so that said power receiving member travels at a greater linear velocity than the elastic deformation stroke velocity of said driving connection of said vibrator to said rod, said power receiving member receiving motor power transmitted down said bore hole for actuation from the earth's surface, said motor means and vibrator being of smaller lateral dimensions than the bore hole formed by the bit and being mounted in a fixed position relative to said rod to accompany said rod down said bore hole, and acoustic mud fluid decoupling means including a resilient cyclically displaceable body positioned in contact with said apparatus and with mud fluid in the bore hole, said body being cyclically displaceable at the longitudinal vibration frequency of said rod so as to accommodate cyclic displacement of the drill fluid by the longitudinal vibrations of said apparatus, and being located at a spacing distance from said bit which is substantially less than a quarter wave length, measured in the surrounding mud fluid, of a sound wave which said bit tends to generate in said mud fluid.

10. Apparatus for drilling a bore hole in the earth, having in combination: an elongated massive elastic drill rod of fixed length, an elastic vibration generator assembly attached to said rod, said assembly embodying a mechanical vibrator having a fixed driving connection to said rod, said vibrator being operable to apply cyclic longitudinal vibration forces on said rod at the frequency of a longitudinal resonant elastic vibration of said rod, a bit drivingly coupled to the end of said rod to transmit forces from said rod to the earth formation below, said assembly also embodying a motor means having a power receiving member drivingly connected to operate said vibrator, and a velocity reducing means connected between said power receiving member and said rod so that said power receiving member travels at a greater linear velocity than the elastic deformation stroke velocity of said driving connection of said vibrator to said rod, said power receiving member receiving motive power transmitted down said bore hole for actuation from the earth's surface, said motor means and vibrator being of smaller lateral dimensions than the bore hole formed by the bit and being mounted in a fixed position relative to said rod to accompany said rod down said bore hole, means for circulating gas-carrying mud fluid through said drilling apparatus and out of said bit into the bore hole, and acoustic mud fluid decoupling means comprising a gas trap bell encircling and connected to the apparatus in the vicinity of said bit, said bell being positioned with its interior cavity exposed to gas-carrying mud fluid issuing from said bit, and being located at a spacing distance from said bit which is substantially less than a quarter wave length, measured in the surrounding mud fluid, of a sound wave which said bit tends to generate in said mud fluid.

11. Apparatus for drilling a bore hole in the earth, having in combination: an elongated massive elastic drill rod of fixed length, an elastic vibration generator assembly attached to said rod, said assembly embodying a mechanical vibrator having a fixed driving connection to said rod, said vibrator being operable to apply cyclic longitudinal vibration forces on said rod at the frequency of a longitudinal resonant elastic vibration of said rod, a bit drivingly coupled to the end of said rod to transmit forces from said rod to the earth formation below, said assembly also embodying a motor means having a power receiving member drivingly connected to operate said vibrator, and a velocity reducing means connected between said power receiving member and said rod so that said power receiving member travels at a greater linear velocity than the elastic deformation stroke velocity of said driving connection of said vibrator to said rod, said power receiving member receiving motive power transmitted down said bore hole for actuation from the earth's surface, said motor means and vibrator being of smaller lateral dimensions than the bore hole formed by the bit and being mounted in a fixed position relative to said rod to accompany said rod down said bore hole, and a jacket means connected to the apparatus and acoustically isolating an end portion of the drill rod from fluid in the bore hole.

12. Earth boring apparatus embodying, in combination, an earth boring tool including a drill rod and a bit coupled thereto, a sonic vibration generator coupled to said drill rod operable to cause said drill rod and bit to have a longitudinal vibratory action in surrounding drilling mud fluid at the frequency of a longitudinal resonant vibration of said members while drilling with said bit in engagement with the bottom of the well hole, said bit having a surface tending to generate an energy consuming sound wave in the surrounding drilling mud fluid while drilling, and an acoustic mud fluid decoupler on said tool comprising a resilient compressible body mounted on said tool in communication with the fluid in the bore hole and located on said tool substantially less than one-quarter wave length distance in the fluid from said wave radiating surface of said tool, said body being cyclically compressible in consonance with sound wave pressure surges arriving at said body through the mud fluid from said wave radiating surface of said bit.

13. Apparatus for deep earth boring having in combination: an earth boring bit, an elongated drill rod drivingly connected to said bit, vibration generating means having a fixed driving connection to said rod and operable to apply cyclic longitudinal vibration forces on said rod, so as to set up longitudinal vibration of said rod and thereby impact said bit against the earth, said combined rod and bit having a surface tending to generate an energy-consuming sound wave directly in the surrounding drilling mud fluid when in contact therewith, said combined rod and bit having a predetermined length at least one quarter wavelength of a sound wave generated in the drilling mud at the correlated frequency of longitudinal vibration of said rod, and an acoustic mud fluid decoupler mounted on said apparatus at a spacing distance from said wave generating surface which is substantially less than a quarter wavelength of the sound wave which said surface tends to generate in the surrounding drilling mud fluid.

14. The subject matter of claim 12, wherein said resilient compressible body comprises a flexible walled gas inflated bag.

15. The subject matter of claim 13, wherein said mud decoupler comprises a flexible walled gas inflated bag.

16. Apparatus for rotary deep earth boring having in combination: a rotary drill string having at its lower end an elongated drill collar, an earth boring bit drivingly connected to said drill collar, said bit including toothed roller cutter means whose teeth are adapted to impact successively against the earth when said drill collar and bit are rotated in the bore hole, said toothed cutter means comprising vibration generating means operating when so impacting against the earth to apply cyclic longitudinal vibration forces on said rod, said combined rod and bit having a surface tending to generate an energy-consuming sound wave directly in the surrounding drilling mud fluid when in contact therewith, said combined rod and bit having a predetermined length at least one quarter wavelength of a sound wave generated in the drilling mud at the correlated frequency of longitudinal vibration of said rod, and an acoustic mud fluid decoupler mounted on said apparatus at a spacing distance from said wave generating surface which is substantially less than a quarter wavelength of the sound wave which said surface tends to generate in the surrounding drilling mud fluid.

References Cited in the file of this patent

UNITED STATES PATENTS

| | | |
|---|---|---|
| 699,273 | Wolski | May 6, 1902 |
| 701,391 | Pruszkowski | June 3, 1902 |
| 1,136,545 | MacDonald | Apr. 20, 1915 |
| 1,666,898 | Hanson | Apr. 24, 1928 |
| 1,859,611 | Yungling | May 24, 1932 |
| 2,016,067 | Bannister | Oct. 1, 1935 |
| 2,170,057 | Kerr | Aug. 22, 1939 |
| 2,359,147 | Merten | Sept. 26, 1944 |
| 2,507,230 | Stinnett | May 9, 1950 |
| 2,554,005 | Bodine, Jr. | May 22, 1951 |